United States Patent
Morisawa

(10) Patent No.: US 11,574,432 B2
(45) Date of Patent: Feb. 7, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keisuke Morisawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/347,618

(22) Filed: Jun. 15, 2021

(65) Prior Publication Data
US 2022/0012932 A1    Jan. 13, 2022

(30) Foreign Application Priority Data
Jul. 8, 2020  (JP) .............................. JP2020-117759

(51) Int. Cl.
*G06T 15/00* (2011.01)
*G06V 10/22* (2022.01)

(52) U.S. Cl.
CPC .............. *G06T 15/00* (2013.01); *G06V 10/22* (2022.01)

(58) Field of Classification Search
CPC . G06T 15/00; G06T 7/194; G06T 7/11; G06T 7/50; G06T 17/00; G06T 19/00; G06T 2207/10028; G06T 7/174
See application file for complete search history.

(56) References Cited

U.S. PATENT DOCUMENTS

| | | | |
|---|---|---|---|
| 2018/0089523 A1* | 3/2018 | Itakura | G06V 20/00 |
| 2019/0311526 A1* | 10/2019 | Sugio | G06T 9/00 |
| 2019/0327475 A1* | 10/2019 | Takeda | H04N 19/23 |

OTHER PUBLICATIONS

A. Laurentini, "The Visual Hull Concept for Silhouette-Based Image Understanding" IEEE Transactions on Pattern Analysis and machine Intelligence (Feb. 1994) pp. 150-162, vol. 16, No. 2.

* cited by examiner

*Primary Examiner* — Hau H Nguyen
(74) *Attorney, Agent, or Firm* — Carter, DeLuca & Farrell LLP

(57) ABSTRACT

The image processing apparatus obtains an image representing an object, performs specific processing for an object included in an area whose object extraction accuracy is lower than a threshold value in the captured image, and generates three-dimensional shape data of the object based on the image representing the object for which the specific processing has been performed.

10 Claims, 19 Drawing Sheets

IMAGE PROCESSING APPARATUS, IMAGE PROCESSING METHOD, AND STORAGE MEDIUM

FIELD

The present disclosure relates to image processing.

DESCRIPTION OF THE RELATED ART

There is a technique to generate a virtual viewpoint image representing a scene in a case where an object is viewed from an arbitrary viewpoint by generating three-dimensional shape data of the object using foregrounds extracted from a plurality of captured images obtained by synchronous image capturing from a plurality of directions with a plurality of imaging apparatuses and performing processing, such as rendering.

As a technique to generate three-dimensional shape data of an object, Laurentini (A. Laurentini, "The Visual Hull Concept of Silhouette-Based Image Understanding". IEEE Transactions on Pattern Analysis and machine Intelligence, Vol. 16, No. 2, pp. 150-162, February 1994) has disclosed a technique to generate three-dimensional shape data of an object by a visual hull method by extracting foregrounds from a plurality of images and deriving a mask image representing a silhouette of the object.

SUMMARY

However, with the technique by Laurentini, a mask image whose foreground extraction accuracy, for example, whose resolution is relatively low and part of which is omitted is also used as it is, and therefore, there is a possibility that the accuracy of data is reduced because part of three-dimensional shape data of an object to be generated is omitted.

The present disclosure presents a technique to suppress a reduction in the accuracy of three-dimensional shape data of an object to be generated.

An image processing apparatus according to one aspect of the present disclosure obtains an image representing an object, which is extracted from a captured image, obtains information for specifying an area whose extraction accuracy of the object is lower than a threshold value in the captured image, performs specific processing for an object included in the area which is specified based on the obtained information, and generates three-dimensional shape data of the object based on the obtained image representing the object for which the specific processing has been performed.

Further features of the present disclosure will become apparent from the following description of exemplary embodiments with reference to the attached drawings.

DESCRIPTION OF THE EMBODIMENTS

In the following, aspects for embodying the present disclosure are explained by using the drawings. However, components described in these embodiments are merely exemplary and not intended to limit the invention to those. Further, all combinations of components explained in the embodiments are not necessarily indispensable to the solution for solving the problem and various modifications and alterations can be made. Explanation is given by attaching the same symbol to the same configuration.

First Embodiment

In the present embodiment, an aspect is explained in which the influence of another foreground rectangular mask whose resolution is high on the generation of a foreground model is suppressed by deriving a low-resolution area in a captured image from camera parameters and a background model and expanding a foreground rectangular mask included in the low-resolution area. Here, the resolution means the size of one pixel of a captured image. Because of this, in a case where the resolution is high, an object is represented by more pixels than in a case where the resolution is low. However, in a case where the distances from the imaging apparatus are different although the objects have the same size, the number of pixels representing each object is different in a captured image. For example, the object relatively close to the imaging apparatus is represented by more pixels than the object relatively far from the imaging apparatus. In this case, the object relatively close to the imaging apparatus is represented with a high resolution compared to the object relatively far from the imaging apparatus. In this case, in the captured image, the area that is represented with a high resolution (for example, the area indicating the object relatively close to the imaging apparatus) is referred to as a high-resolution area and the area that is represented with a low resolution (for example, the area indicating the object relatively far from the imaging apparatus) is referred to as a low-resolution area. The resolution may change depending also on the viewing angle and the like. In the present embodiment, explanation is given by taking a case of a moving image as an example, but the explanation also applies to a case of a still image.

<System Configuration>

Figure 1:
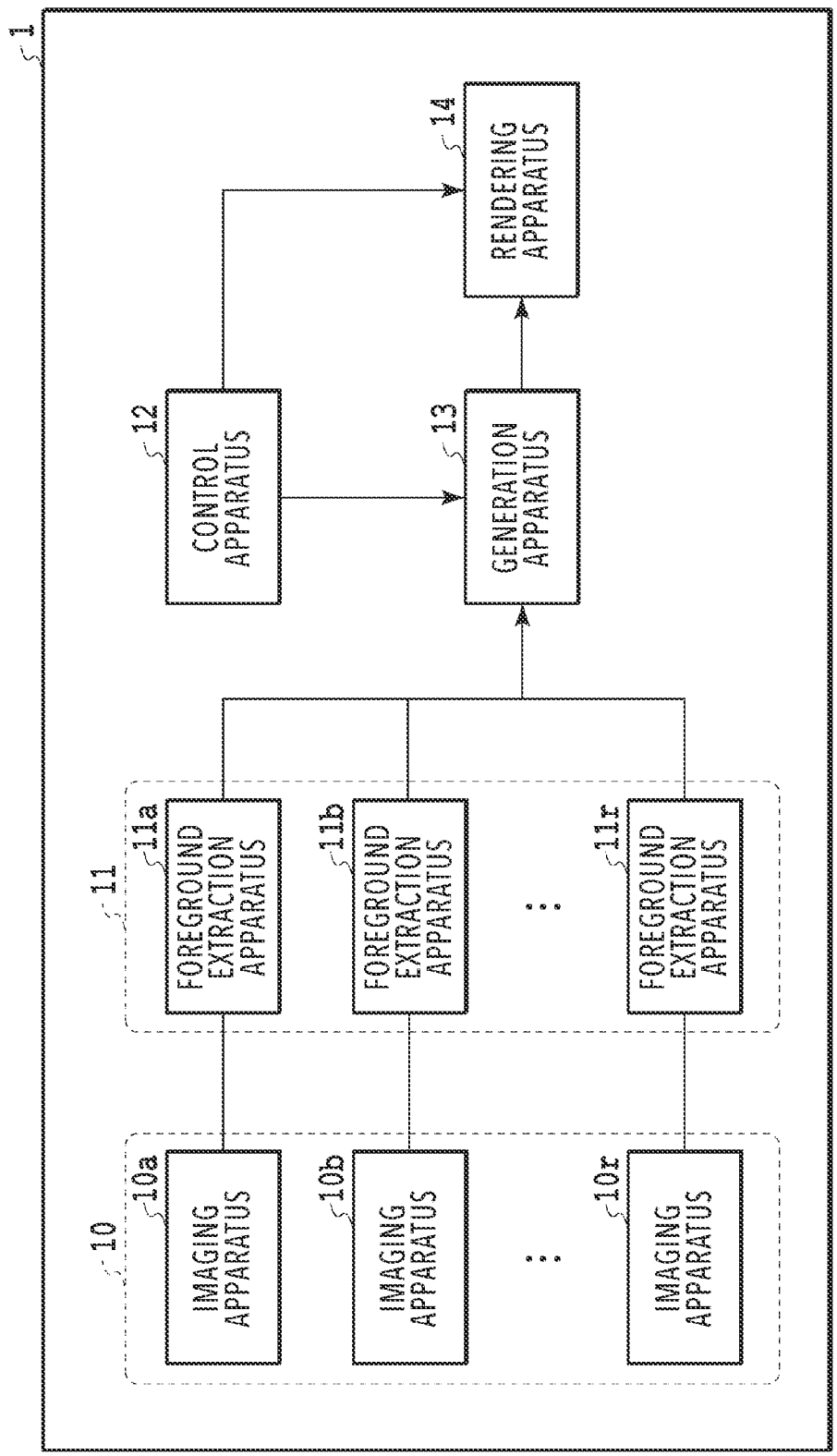
FIG. 1 is a schematic diagram of an image processing system.

FIG. 1 is a block diagram showing a configuration example of an image processing system that generates a virtual viewpoint image according to the present embodiment. An image processing system 1 has an imaging apparatus group 10 including a plurality of imaging apparatuses 10a to 10r, a foreground extraction apparatus group 11 including a plurality of foreground extraction apparatuses 11a to 11r, a control apparatus 12, a generation apparatus 13, and a rendering apparatus 14.

Figure 2:
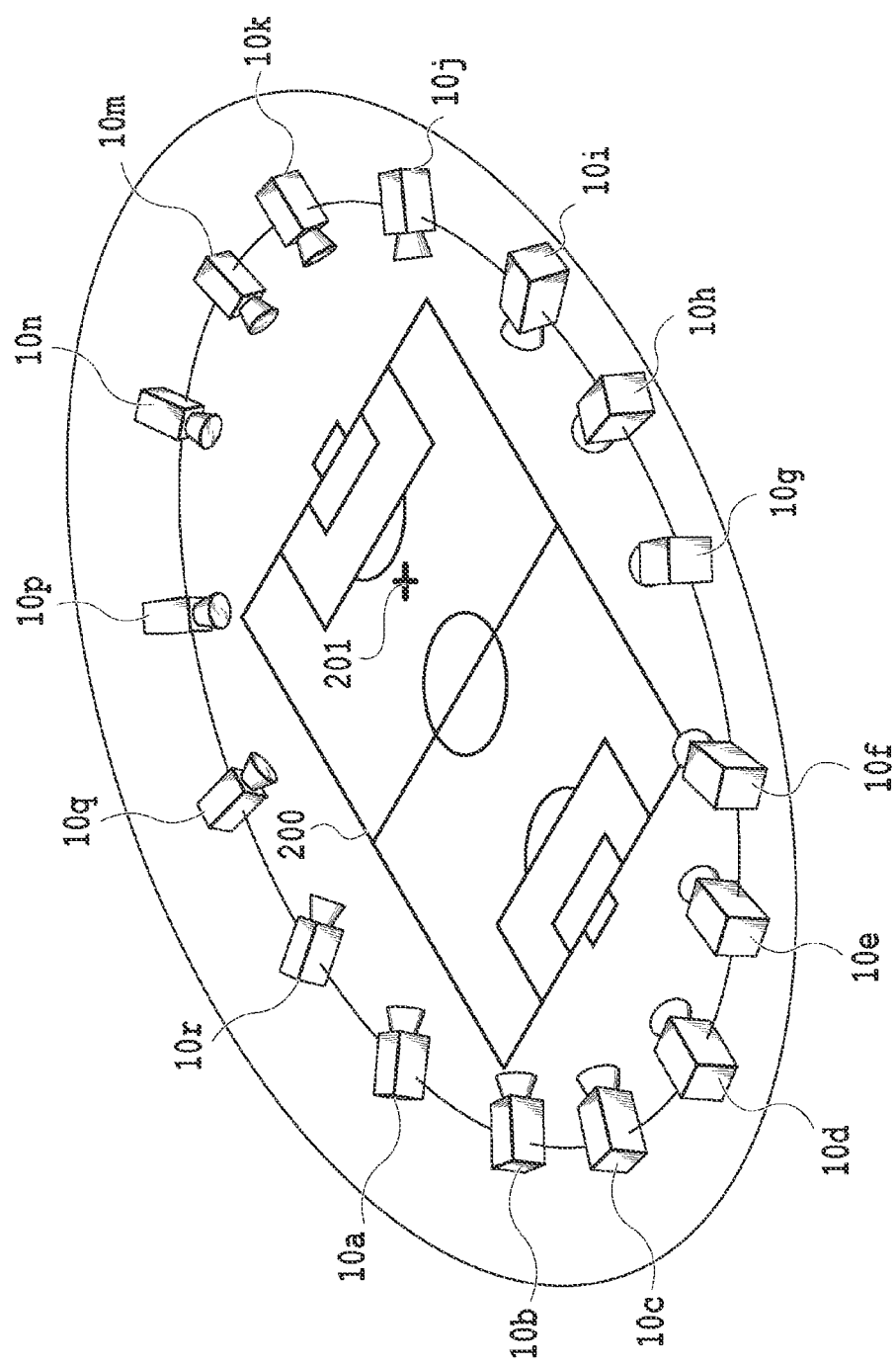
FIG. 2 is a diagram showing an arrangement example of imaging apparatuses.

The imaging apparatus group 10 includes the plurality of the imaging apparatuses 10a to 10r and synchronously captures an object from a variety of angles. Data of a captured image (processed image) obtained by image capturing of each imaging apparatus is associated with each imaging apparatus and sent to each of the foreground extraction apparatuses 11a to 11r configuring the foreground extraction apparatus group 11. In the present embodiment, each of the imaging apparatuses 10a to 10r configuring the imaging apparatus group 10 is arranged so as to surround a field 200 within a stadium as shown in FIG. 2. Each of the imaging apparatuses 10a to 10r performs image capturing in time synchronization by taking a point 201 on the field 200 as a gaze point.

Each of the foreground extraction apparatuses 11a to 11r configuring the foreground extraction apparatus group 11 extracts the portion of an object, which is a foreground, from the captured imaged of the imaging apparatus associated with itself and generates a foreground rectangular mask and a foreground rectangular texture.

<About Foreground, Background, Mask, Texture>

Here, the foreground refers to a dynamic object that can be viewed from an arbitrary viewpoint within an image capturing space and which is the target of generation of a three-dimensional model and in the present embodiment, the representative example of the foreground is a person and a ball existing on the field. The static object other than the foreground, such as the goal on the field and the spectator stand, is the background. Further, the foreground rectangular mask is a binary silhouette image representing the foreground portion of a captured image in white and representing the background portion in black. The foreground rectangular texture is a multi-valued image obtained by cutting out a rectangular (circumscribed rectangular) portion including the foreground from a captured image. As the method of extracting a foreground from a captured image, for example, there is a background difference method. The background difference method is a method of extracting a portion whose difference is larger than or equal to a predetermined value by storing in advance a background image obtained by performing image capturing in a state where there is no dynamic object, which is a foreground, for example, such as a state before a game is started, and detecting a difference between the background image and a captured image in a state where there is a dynamic object. It may also be possible to use another method for extraction of a foreground, such as an inter-frame difference method. Data of the foreground rectangular mask and the foreground rectangular texture, which are generated, is sent to the generation apparatus 13.

<About Foreground Extraction and Output Data>

Figure 3A:
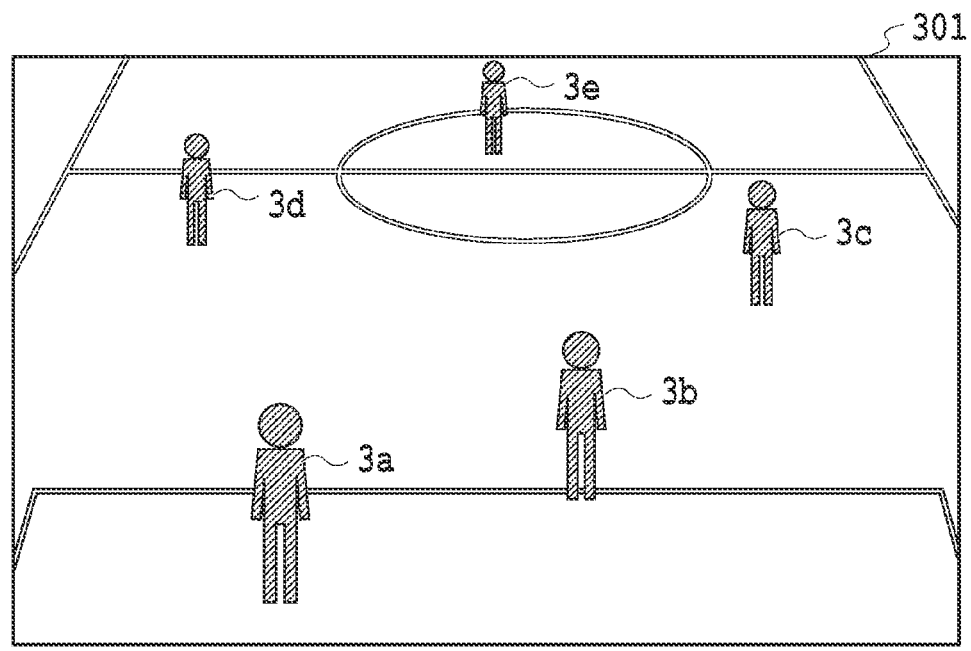
FIG. 3A and FIG. 3B are diagrams explaining foreground extraction processing.
Figure 3B:
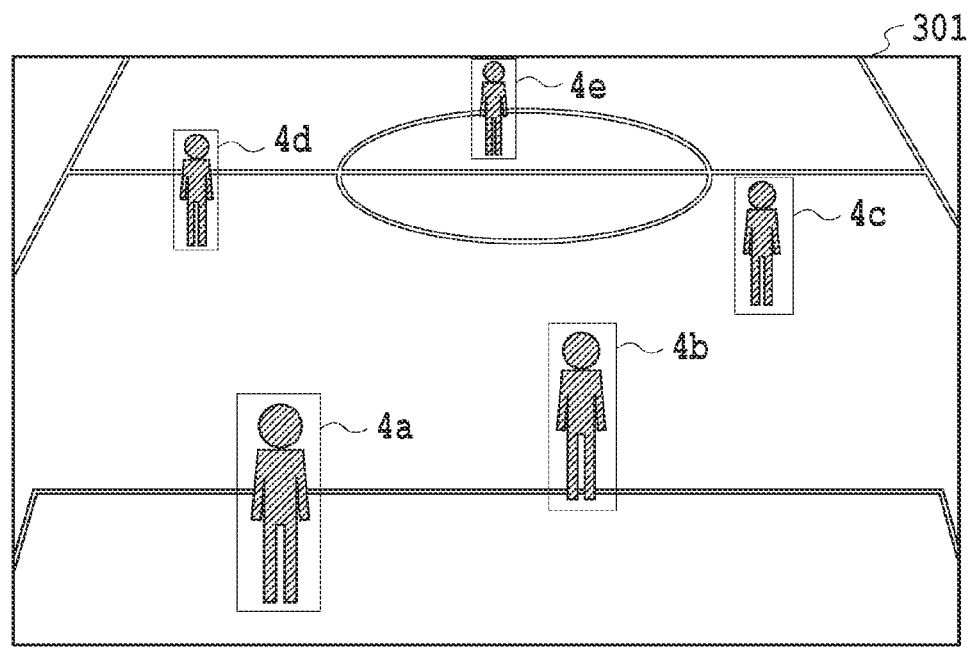

Here, a foreground extraction processing example by the foreground extraction apparatus is explained by using the drawings. FIG. 3A and FIG. 3B are diagrams explaining a foreground extraction processing example and FIG. 3A shows a captured image 301 obtained by the imaging apparatus 10m capturing the gaze point 201 on the field and FIG. 3B shows a rectangular area example including a foreground extracted from the captured image 301 in FIG. 3A. As shown in FIG. 3A, the captured image (also referred to as image data) 301 includes five foregrounds 3a to 3e.

In a case where the captured image 301 in FIG. 3A, which is obtained by the image capturing of the imaging apparatus 10m is input, the foreground extraction apparatus 11m detects the foreground regions 3a to 3e from the captured image 301 and derives five rectangular areas 4a to 4e including the foreground regions 3a to 3e, respectively.

Figure 4A:
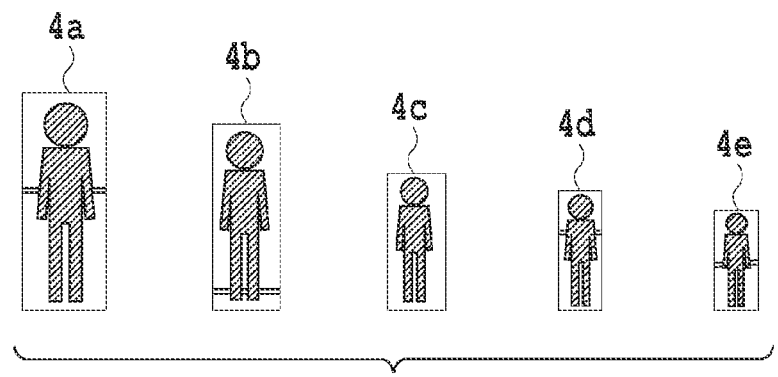
FIG. 4A and FIG. 4B are diagrams showing an output data example of a foreground extraction apparatus.
Figure 4B:
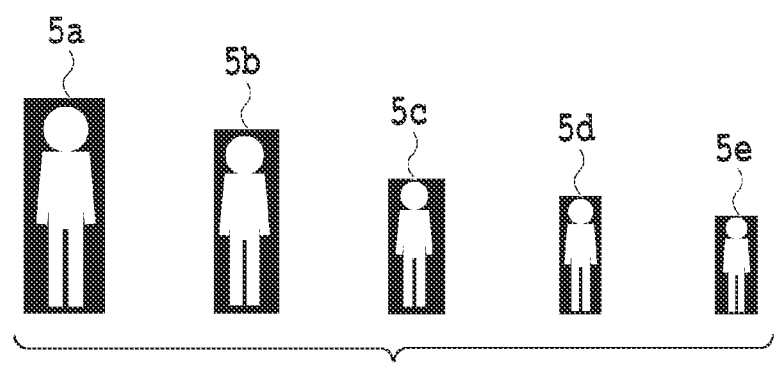

FIG. 4A and FIG. 4B are diagrams showing output data examples of the foreground extraction apparatus. FIG. 4A shows a plurality of foreground rectangular texture images (in the following, also called foreground rectangular textures) obtained by cutting out the rectangular areas shown in FIG. 3B from the captured image. FIG. 4B shows foreground rectangular mask images (in the following, also called foreground rectangular masks) that are binary images representing the foreground region included in the rectangular area shown in FIG. 3B in white and the other in black. The foreground rectangular texture images and the foreground rectangular mask images, which are obtained by the derivation of the foreground extraction apparatus, are sent to the generation apparatus 13 along with coordinate information on the rectangular areas.

As a detection method of a foreground region, it is possible to use a publicly known method. For example, it may also be possible to use a method of detecting an area including pixels whose difference of the value based on the pixel value exceeds a threshold value as a foreground region by comparing the pixel value of a captured image and that of a background image that corresponds to the captured image and which is stored in advance.

The control apparatus 12 obtains the camera parameters of each of the imaging apparatuses 10a to 10r and the background model, receives virtual viewpoint information via a UI (User Interface), not shown schematically, and so on. The camera parameters include external parameters and internal parameters. The external parameters include a rotation matrix and a translation matrix and are parameters indicating the position and orientation of the imaging apparatus. The internal parameters include the focal length, the optical center and the like of the imaging apparatus and are parameters indicating the viewing angle of the imaging apparatus, the size of an imaging sensor, and the like. The processing to derive the camera parameters is called calibration and the camera parameters are found by using a correspondence relationship between points in a three-dimensional world coordinate system obtained by using a plurality of images obtained by capturing a specific pattern, such as a checkerboard, and two-dimensional points corresponding thereto. The obtained camera parameters of each of the imaging apparatuses 10a to 10r are sent to the generation apparatus 13 and the rendering apparatus 14. The background model includes three-dimensional shape data of the background representing the three-dimensional space of the image capturing environment of each of the imaging apparatuses 10a to 10r. The obtained background model is sent to the generation apparatus 13 and the rendering apparatus 14. The virtual viewpoint information includes the position and orientation of a virtual viewpoint (virtual imaging apparatus) that is set on a synchronous image capturing-target three-dimensional space, the gaze point, the movement path and the like and is designated by a user using, for example, a dedicated joystick, or automatically set in accordance with an image capturing scene. The virtual viewpoint information that is set based on a user input or the like is sent to the rendering apparatus 14.

The generation apparatus 13 reconfigures the foreground mask (in the following, also called foreground mask image) corresponding to the captured image of each of the imaging apparatuses 10a to 10r based on the plurality of the foreground rectangular masks, the coordinate information on the rectangular areas, and the camera parameters, which are input.

Figure 5:
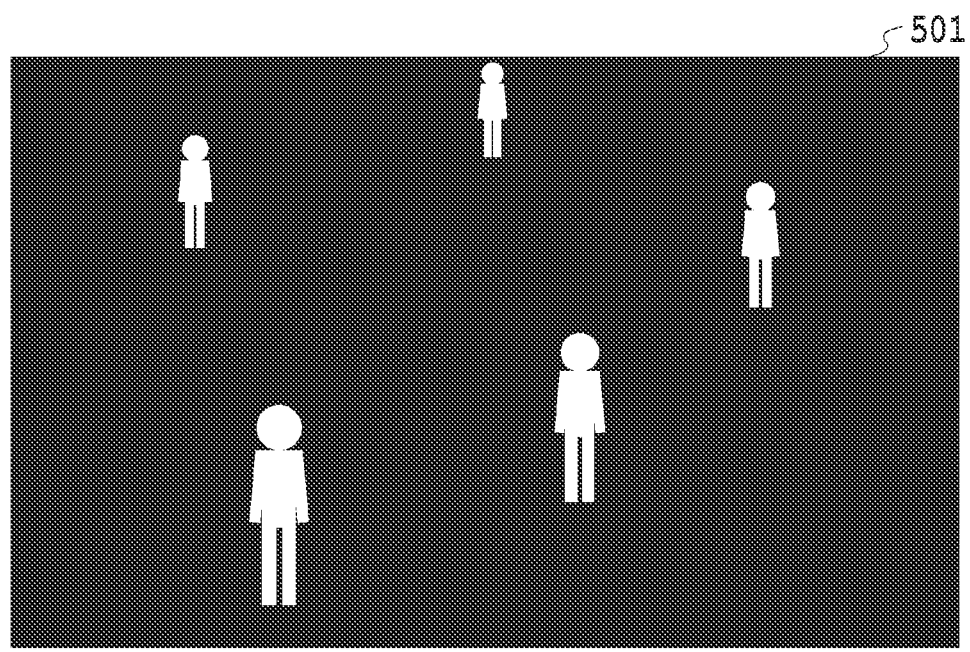
FIG. 5 is a diagram showing a foreground mask example.

FIG. 5 is a diagram showing a foreground mask example reconfigured based on the foreground rectangular masks shown in FIG. 4B and the coordinate information on each foreground rectangular mask.

The foreground rectangular mask is a rectangular image obtained by cutting out each foreground from the captured image in a rectangle including the foreground. A foreground mask 501 is a composited image obtained by pasting each foreground rectangular mask to the coordinates at which each foreground rectangular mask is cut out based on the coordinate information on each foreground rectangular mask as shown in FIG. 5.

Following the above, the generation apparatus 13 generates a three-dimensional model (three-dimensional shape data of an object) of the foreground represented by a voxel set by the visual hull method using the plurality of the foreground rectangular masks derived from the captured images of the plurality of the imaging apparatuses. Details of the generation method of a three-dimensional model of the foreground by the generation apparatus 13 will be described later. The generated three-dimensional model of the foreground is sent to the rendering apparatus 14.

Figure 6C:
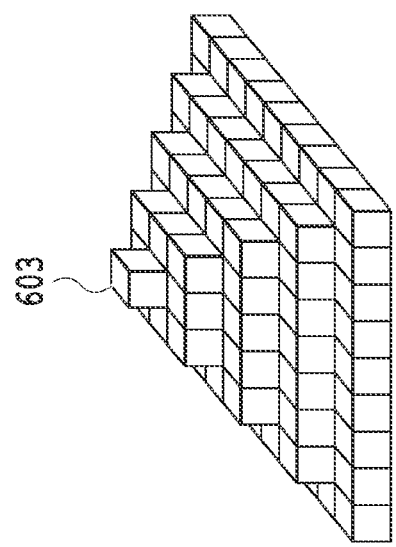
FIG. 6A to FIG. 6C are diagrams showing a three-dimensional model in a voxel format.
Figure 6B:
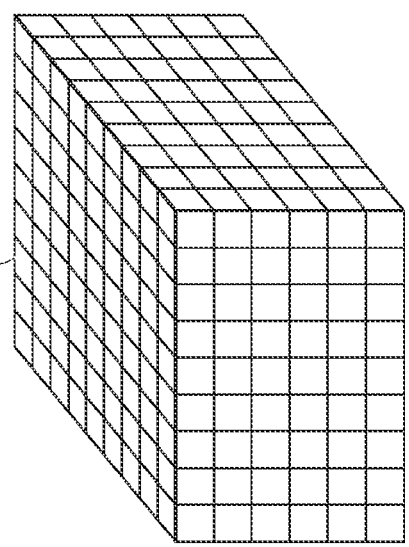
Figure 6A:

In the present embodiment, explanation is given by taking a voxel format as an example of the data format of a three-dimensional model. FIG. 6A to FIG. 6C are diagrams showing a three-dimensional model in the voxel format. In the voxel format, a three-dimensional shape is represented by using a small cube 601 as shown in FIG. 6A, which is called "voxel". A voxel set 602 representing a target three-dimensional space in which a three-dimensional model is generated includes a plurality of voxels as shown in FIG. 6B and is presented by the shape of a cuboid as shown in FIG. 6B. A three-dimensional model 603 in the shape of a quadrangular pyramid includes voxels as components and is generated as shown in FIG. 6C by deleting voxels in a non-foreground region within the target three-dimensional space by the visual hull method from the voxel set 602 shown in FIG. 6B.

The data format of a three-dimensional model may be another format, such as a point cloud format using a point cloud as components representing a shape and a polygon mesh format using polygons.

Figure 7A:
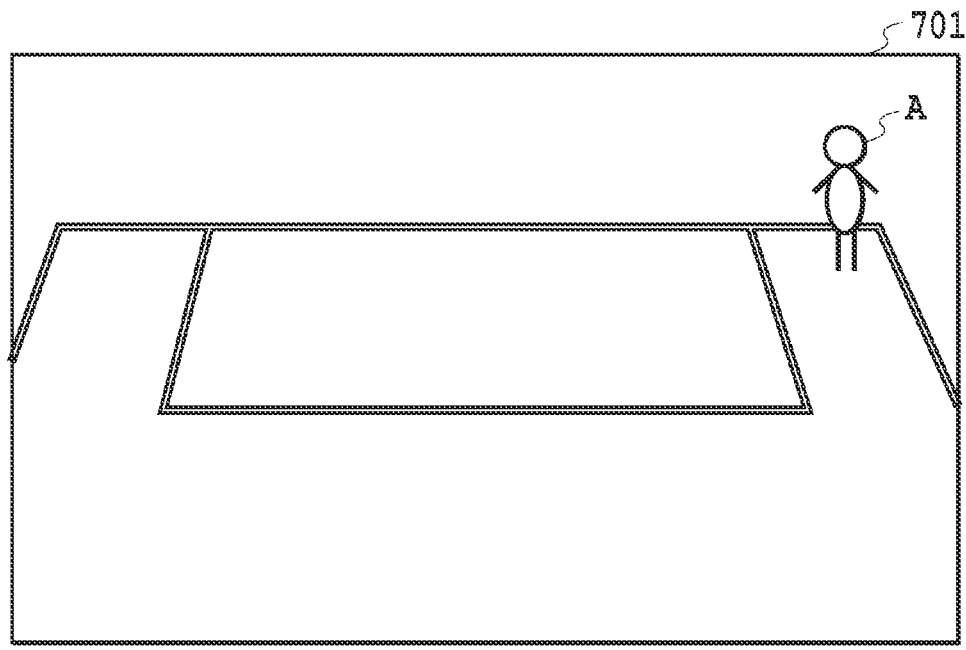
FIG. 7A and FIG. 7B are diagrams showing captured image examples of an object by a proximity imaging apparatus and an object by a remote imaging apparatus.
Figure 7B:
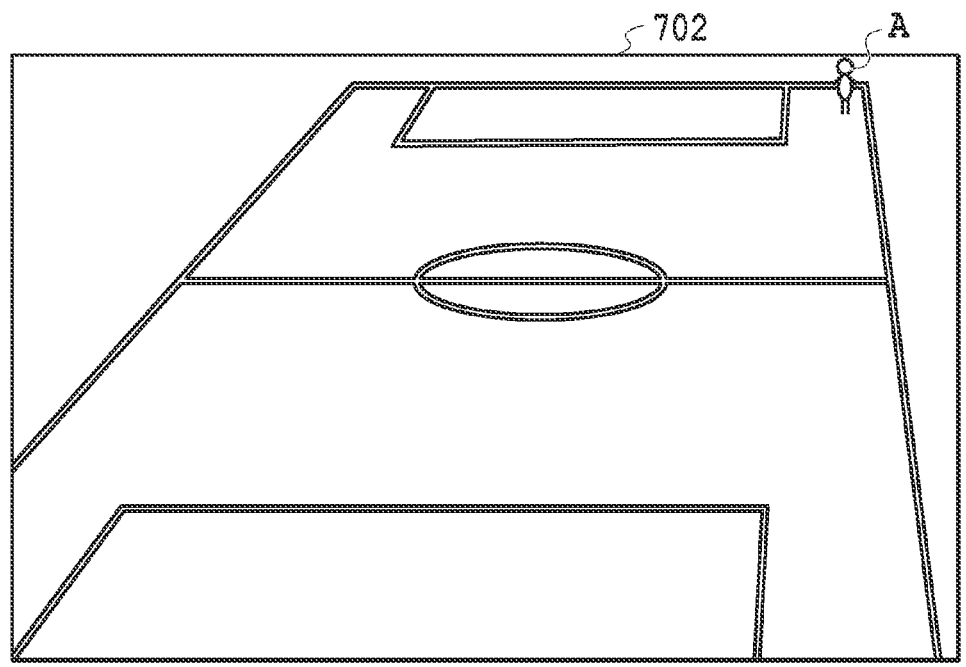

Here, a relationship among an object, an imaging apparatus, and the resolution of a captured image is explained by using the diagrams. FIG. 7A and FIG. 7B are diagrams explaining a low-resolution area and FIG. 7A shows an example of a captured image 701 obtained by image capturing of a proximity imaging apparatus relatively close to an object A and FIG. 7B shows an example of a captured image 702 obtained by image capturing of a remote imaging apparatus relatively far from the object A. In the captured image 701, the resolution of the object A is high and it is possible to extract a foreground from the captured image with a high accuracy, and therefore, the possibility that the mask image of the object A is appropriate is strong. On the other hand, in the captured image 702, the resolution of the object A is low and part of the object A is not detected in the captured image 702 and it is only possible to extract a foreground from the captured image with a low accuracy, and therefore, the possibility that the mask image of the object A is inappropriate is strong.

Consequently, first, the generation apparatus 13 derives an area whose size per pixel is larger than a predetermined threshold value (for example, 2 cm) in the captured image as an area whose resolution is relatively low (in the following, also called low-resolution area) from the background model and the camera parameters of each imaging apparatus. It is assumed that the predetermined threshold value is set in advance by a user, but it may be set at the time of deriving a low-resolution area. Next, the generation apparatus 13 determines whether or not the foreground rectangular mask derived from the captured image of each imaging apparatus is included within the low-resolution area of the captured image. It may be possible for the generation apparatus 13 to determine that the foreground rectangular mask is included within the low-resolution area of the captured image in a case where, for example, the position at which the corresponding object is located (for example, position at which a player stands) or the portion of the foreground rectangular mask corresponding to the centroid position or the like is within the low-resolution area. Next, the generation apparatus 13 performs expansion processing for the foreground rectangular mask included within the low-resolution area with an expansion ratio higher than 1, and for the foreground rectangular mask not included within the low-resolution area with an expansion ratio of 1 and generates a foreground rectangular mask after the expansion processing as a converted foreground rectangular mask. It may also be possible for the generation apparatus 13 to generate the foreground rectangular mask not included in the low-resolution area as it is as a converted foreground mask image by performing the expansion processing with an expansion ratio of 1, which is equivalent to not performing the expansion processing. That is, the generation apparatus 13 performs the expansion processing for the foreground rectangular mask in accordance with the determination results. Then, the generation apparatus 13 generates a three-dimensional model of the foreground by the visual hull method using the converted foreground rectangular mask. The generation apparatus 13 sends the generated three-dimensional model of the foreground to the rendering apparatus 14 as a foreground model along with the foreground rectangular texture.

The rendering apparatus 14 reconfigures the three-dimensional space and generates a virtual viewpoint image by appending the color of the foreground rectangular texture to all the voxels configuring the foreground model based on the foreground model, the foreground rectangular texture, the camera parameters, and the virtual viewpoint information, which are input. Specifically, the rendering apparatus 14 finds a positional relationship between the foreground rectangular texture indicating the foreground and the three-dimensional model from the camera parameters that are input from the control apparatus 12 and performs coloring processing based on the color of the pixel of the texture corresponding to each voxel. Then, the rendering apparatus 14 reconfigures the three-dimensional space and generates a virtual viewpoint image representing an appearance from the virtual viewpoint indicated in the virtual viewpoint information. The generated virtual viewpoint image is transferred to a user terminal and the like. Consequently, it is made possible to generate and browse a virtual viewpoint image based on captured images from a plurality of directions and it is possible to view a highlight scene of, for example, soccer and basketball, from a variety of angles, and therefore, it is possible to give a user a high feeling of being at a live performance compared to a normal image.

The above is the outline of the configuration of the image processing system according to the present embodiment. As regards the connection between the foreground extraction apparatuses 11a to 11r and the generation apparatus 13, it may also be possible to adopt any network topology, such as the star type, the ring type, and the bus type.

<Details of Generation Apparatus>

Following the above, the generation apparatus 13 according to the present embodiment is explained in detail.

<Hardware Configuration>

Figure 8:
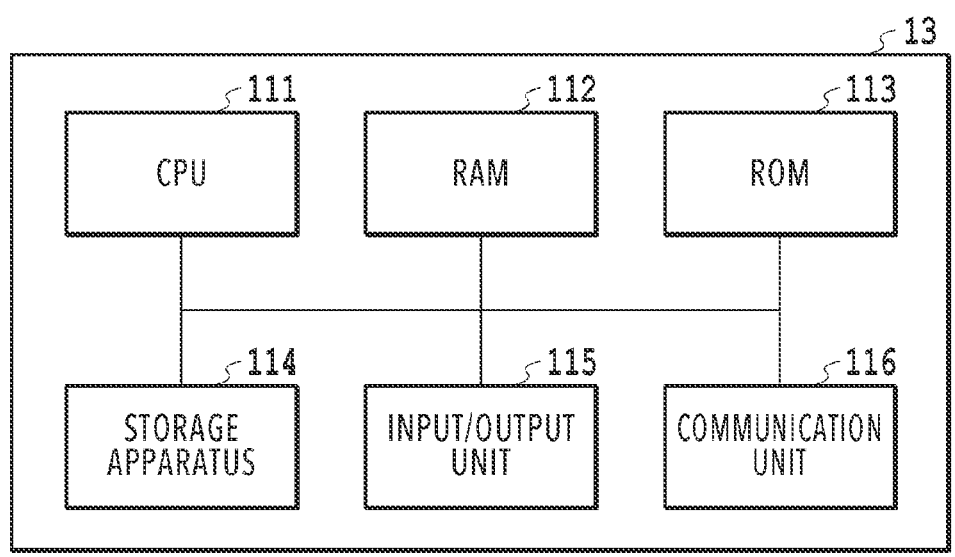
FIG. 8 is a diagram showing a hardware configuration example of a generation apparatus.

FIG. 8 is a block diagram showing a hardware configuration example of the image processing apparatus as the generation apparatus 13. The hardware configuration of the foreground extraction apparatus 11, the control apparatus 12, and the rendering apparatus 14 is similar to the hardware configuration of the generation apparatus 13, which is explained in the following. The generation apparatus 13 has a CPU 111, a RAM 112, a ROM 113, a storage apparatus 114, an input/output unit 115, and a communication unit 116.

The CPU 111 is a central processing unit and implements each function of the generation apparatus 13 shown in FIG. 9, to be described later, by controlling the entire apparatus using computer programs and data stored in the RAM 112 and the ROM 113. The CPU 111 implements each function unit of the generation apparatus 13 shown in FIG. 9 by, for example, loading a predetermined program stored in the storage apparatus 114 onto the RAM 112 and executing the program loaded onto the RAM 112. The ROM 113 is a read-only nonvolatile memory. The RAM 112 is a random access memory that can be read and written at any time. As the RAM 112, it is possible to use a DRAM (Dynamic Random Access Memory).

The storage apparatus 114 is a large-capacity storage apparatus including, for example, a hard disk and the like and stores various kinds of data, such as image data and voice data. It is possible to store captured images obtained from the plurality of the imaging apparatuses 10a to 10r, and the like in the storage apparatus 114. The input/output unit 115 includes a display apparatus, such as a liquid crystal display, which displays various kinds of setting information, image data and the like, and an input apparatus, such as a mouse, a keyboard, and a touch panel, which receives inputs of various kinds of setting information and operation instructions, by a user to the generation apparatus 13. The communication unit 116 is a communication device that performs communication control of the generation apparatus 13 and the external apparatus and in the present embodiment, the plurality of the foreground extraction apparatuses 11a to 11r and the rendering apparatus 14 are connected so as to be capable of communication. The foreground extraction apparatuses 11a to 11r and the generation apparatus 13 are connected via a network, such as LAN.

Each function unit that is implemented in the generation apparatus 13 is implemented by the CPU 111 executing a predetermined program, but this is not limited. For example, it may also be possible to utilize hardware, such as a GPU (Graphics Processing Unit) and an FPGA (Field Programmable Gate Array), for increasing the speed of computing. That is, it may also be possible to implement each function unit of the generation apparatus 13 by the collaboration of software and hardware, such as a dedicated IC, or implement part or all of the functions by hardware alone. Further, it may also be possible to use a configuration in which the processing of each function unit is dispersed and performed by using a plurality of the generation apparatuses 13.

<Software Configuration>

Figure 9:
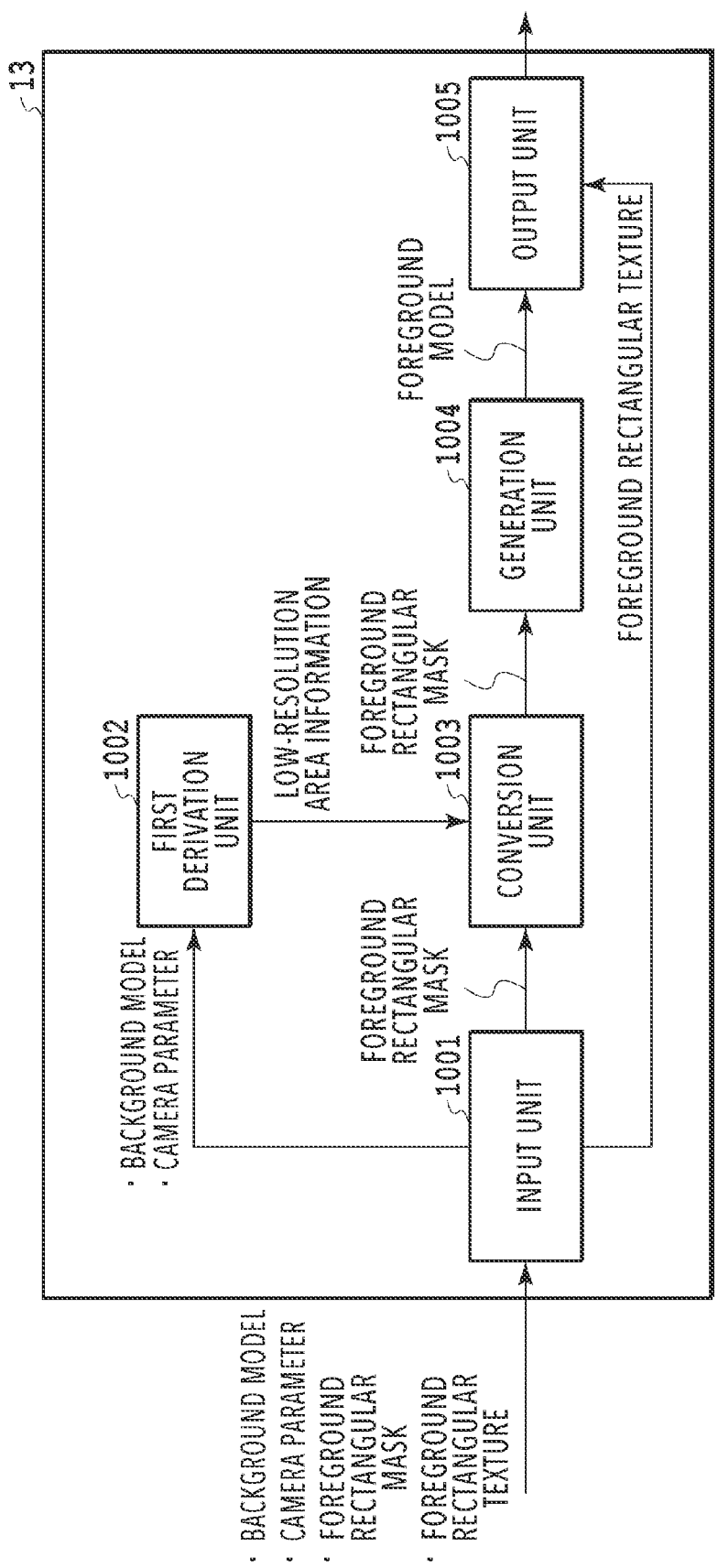
FIG. 9 is a diagram showing a function configuration example of the generation apparatus.

FIG. 9 is a function block diagram showing a software configuration example of the generation apparatus 13 of the present embodiment. The generation apparatus 13 has an input unit 1001, a first derivation unit 1002, a conversion unit 1003, a generation unit 1004, and an output unit 1005. Each of these function units is implemented by the CPU 111 within the generation apparatus 13 described above loading a predetermined program stored in the ROM 113 or the storage apparatus 114 onto the RAM 112 and executing the program. In the following, each function unit is explained.

The input unit 1001 receives inputs of various kinds of data from an external apparatus. Specifically, the input unit 1001 receives an input of data of the camera parameters of each of the imaging apparatuses 10a to 10r and the background model representing the three-dimensional shape of a background, such as a sports stadium, from the control apparatus 12. The data of the camera parameters and the background model, whose input is received, is sent to the first derivation unit 1002.

Further, the input unit 1001 receives an input of data of the foreground rectangular texture indicating the texture of the rectangular area including the foreground, which is derived from the captured image of each imaging apparatus, and the foreground rectangular mask binarized into the rectangular area foreground and the other. The data of the foreground rectangular mask whose input is received is sent to the conversion unit 1003. The data of the foreground rectangular texture whose input is received is sent to the output unit 1005.

The first derivation unit 1002 derives and obtains information for specifying a low-resolution area as low-resolution area information in the captured image of each imaging apparatus based on the data of the background model and the camera parameters, which is input from the input unit 1001, and a predetermined threshold value. For example, it may also be possible for the first derivation unit 1002 to derive information on an area whose resolution indicating the size on the three-dimensional shape per pixel of the captured image of each imaging apparatus is higher than a predetermined threshold value as low-resolution area information by arranging each imaging apparatus based on the camera parameters on the background model representing the three-dimensional shape. The derived low-resolution area information is sent to the conversion unit 1003. As the predetermined threshold value, for example, it may also be possible to set a numerical value common to the captured images of all the imaging apparatuses or set an individual numerical value for the captured image of each imaging apparatus in accordance with a correspondence relationship between the gaze point of the background model and the imaging apparatus. It can also be said that the low-resolution area information is information for specifying an area whose foreground extraction accuracy is lower than a threshold value.

Further, it may also be possible to obtain the low-resolution area based on distance information. It may also be possible to obtain the distance information by, for example, measuring the distance to the object using a laser or an ultrasonic wave.

The conversion unit 1003 generates a converted foreground rectangular mask by performing the expansion processing for the foreground rectangular mask based on the low-resolution area information that is input from the first derivation unit 1002 and the foreground rectangular mask that is input from the input unit 1001. Specifically, the conversion unit 1003 generates a converted foreground rectangular mask obtained by converting the foreground rectangular mask by performing the expansion with an expansion ratio higher than 1 so that the entire foreground rectangular mask included in the low-resolution area indicated in the low-resolution area information covers the entire foreground. By increasing the size of the foreground silhouette by expanding the mask portion of the foreground rectangular mask as described above, the undetected foreground resulting from the low resolution is complemented and the possibility that part thereof is deleted erroneously is reduced, and therefore, a reduction in the accuracy of the data of the foreground model to be generated is suppressed. The conversion unit 1003 generates the foreground rectangular mask as the converted foreground rectangular mask by performing the expansion processing with an expansion ratio of 1, or not performing the expansion processing for the foreground rectangular mask that is not included in the low-resolution area. The generated foreground rectangular mask is sent to the generation unit 1004.

The generation unit 1004 generates data of the foreground model by the visual hull method from the plurality of the foreground rectangular masks and the camera parameters indicating the position and orientation of the imaging apparatus group 10, which are input. That is, it can be said that the generation unit 1004 generates the three-dimensional shape data of the object, which is the foreground model, by using the conversion results of the image data of the mask, which is the foreground rectangular mask. The generated data of the foreground model is sent to the output unit 1005.

Figure 10A:
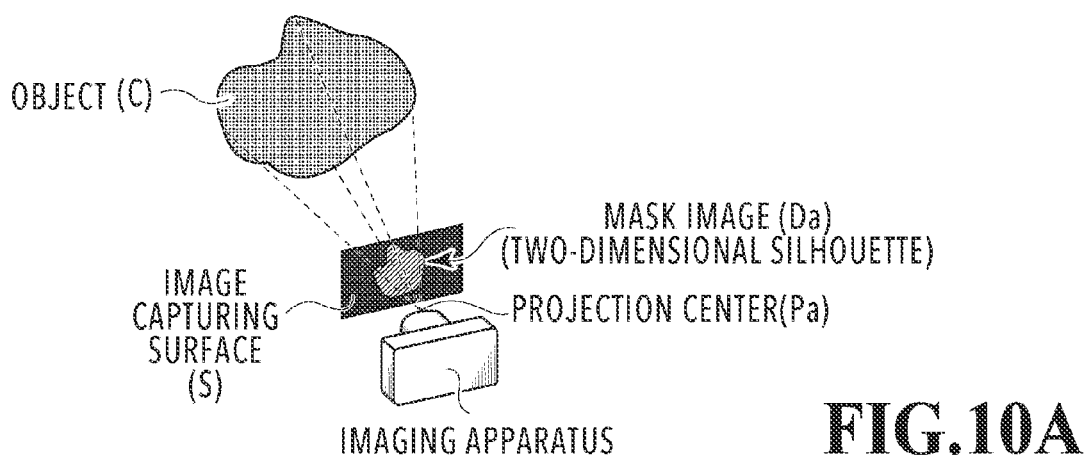
FIG. 10A to FIG. 10C are diagrams explaining the basic principle of a visual hull method.
Figure 10B:
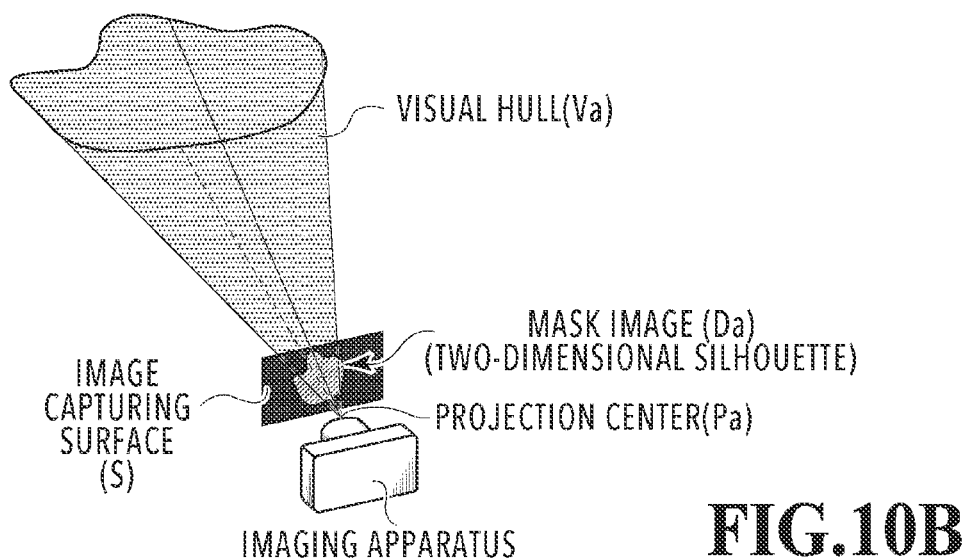
Figure 10C:
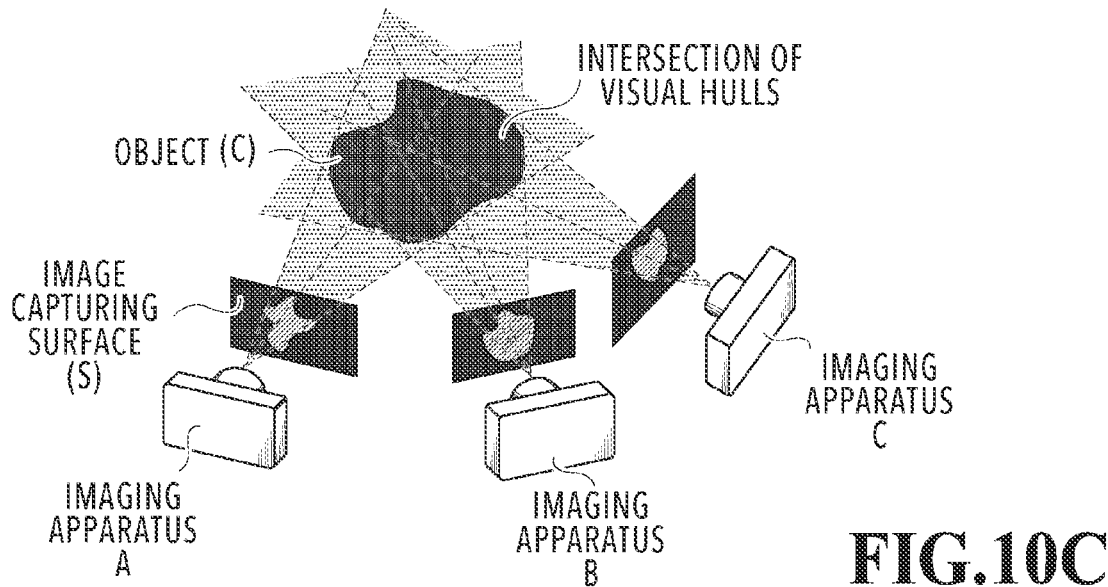

Here, the visual hull method is explained. The visual hull method is a representative method of generating a three-dimensional model corresponding to the above-described foreground model based on, for example, captured images obtained by performing image capturing with a plurality of imaging apparatuses and in recent years, many systems based on the method are developed. FIG. 10A to FIG. 10C are diagrams explaining the fundamental principle of the visual hull method. From a captured image of a certain object (C), a mask image (Da) representing a two-dimensional silhouette (foreground region) of the object is obtained on an image capturing surface (S) by performing binarization based on differences in color and luminance from the background (FIG. 10A). Then, a pyramidal form that spreads into a three-dimensional space is considered, whose side extends from a projection center (Pa) of the imaging apparatus and passes through each point on the contour of the mask image (Da) (FIG. 10B). This pyramidal form is called a "visual hull (Va)" of the target by the corresponding imaging apparatus.

Following the above, from the foreground regions based on images obtained by synchronous image capturing by a plurality of imaging apparatuses (in the example shown in FIG. 10C, three of imaging apparatuses A, imaging apparatus B. and imaging apparatus C) whose installation locations are different, a common area of a plurality of visual hulls, that is, the intersection of the visual hulls is found. Due to this, the three-dimensional model (three-dimensional shape data) of the object (foreground) is found (FIG. 10C). The visual hull method is an example as the method of generating a three-dimensional model of an object and the method is not limited to the visual hull method.

The output unit 1005 outputs model information including the data of the foreground rectangular texture that is input from the input unit 1001 and the foreground model (three-dimensional shape data of the object) that is input from the generation unit 1004 to the rendering apparatus 14.

<Processing Flow in Generation Apparatus>

Figure 11:
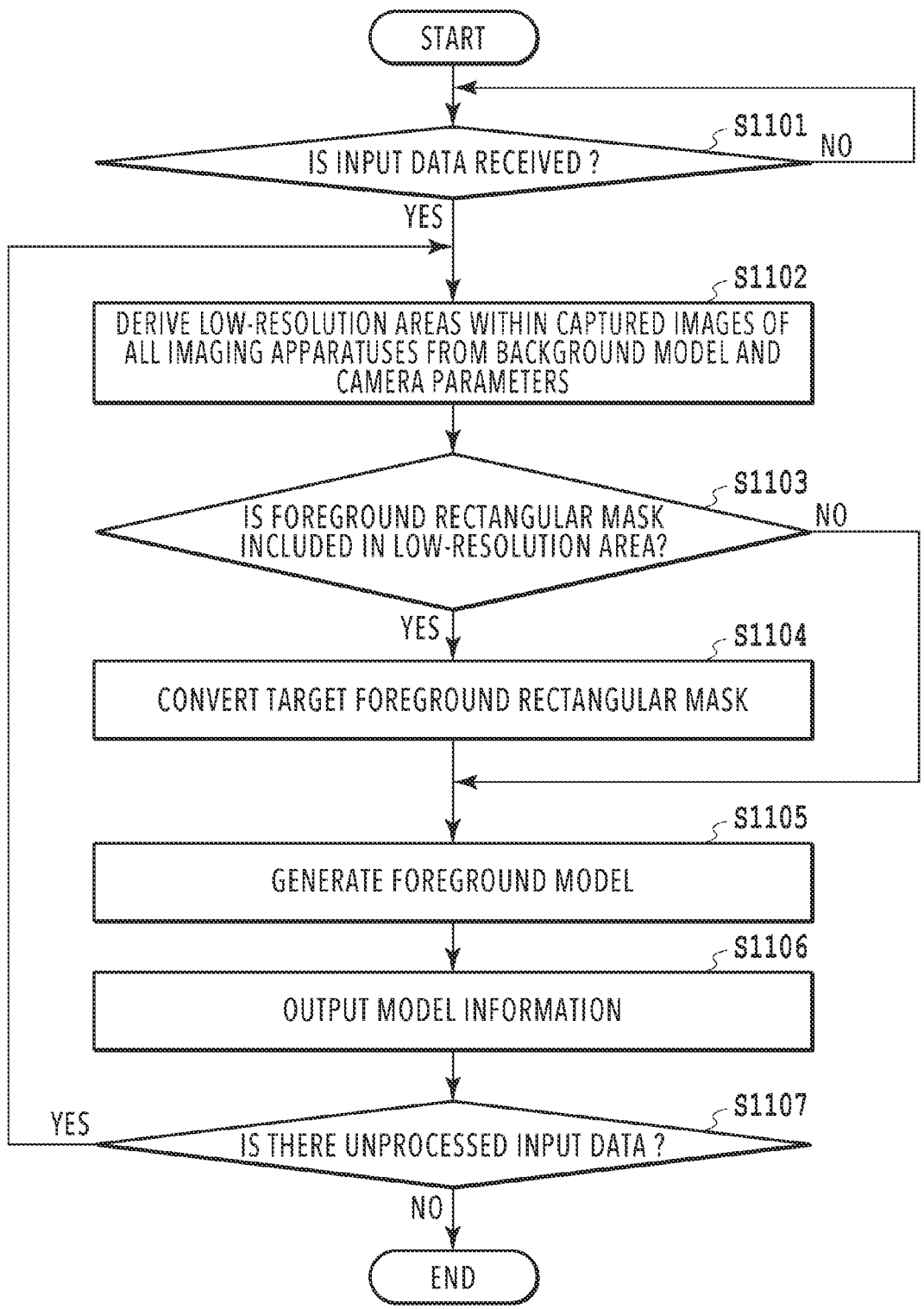
FIG. 11 is a flowchart showing a flow of processing performed by the generation apparatus.

FIG. 11 is a flowchart showing a flow of the processing performed by the generation apparatus 13 according to the present embodiment. It is assumed that the camera parameters have already been received from the control apparatus 12 and stored in the RAM 112 or the like and the predetermined threshold value by which a low resolution is determined has already been set based on the user input before the execution of the flowchart in FIG. 11 is started. In the following, along the flowchart in FIG. 11, the flow of the processing performed by the generation apparatus 13 is explained. Symbol "S" in explanation of the flowchart indicates a step (process). This is also the same in explanation of the following flowcharts.

At S1101, the input unit 1001 monitors the reception of input data (data of foreground rectangular mask of each imaging apparatus) necessary for the generation of a foreground model. In a case where the reception of input data is detected (YES at S1101), the input unit 1001 moves the processing to S1102. The various kinds of data that are input to the input unit 1001 are sent to each function unit. In the present embodiment, it is premised that the data of a plurality of captured images is a moving image, and therefore, the processing at S1102 and the subsequent steps is performed for each frame.

At S1102, the first derivation unit 1002 derives information (low-resolution area information) indicating an area whose resolution is relatively low within the captured images of all the imaging apparatuses based the camera parameters and the background mode, which are input from the input unit 1001, and the threshold value that is set in advance.

Figure 12A:
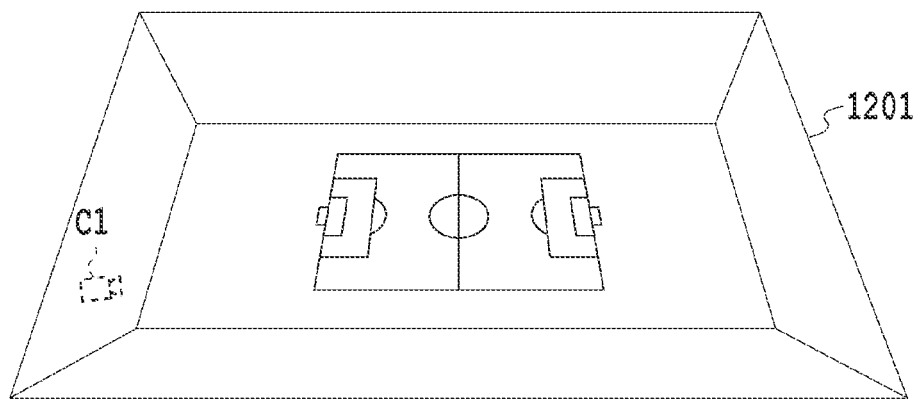
FIG. 12A to FIG. 12C are diagrams explaining low-resolution area information.
Figure 12B:
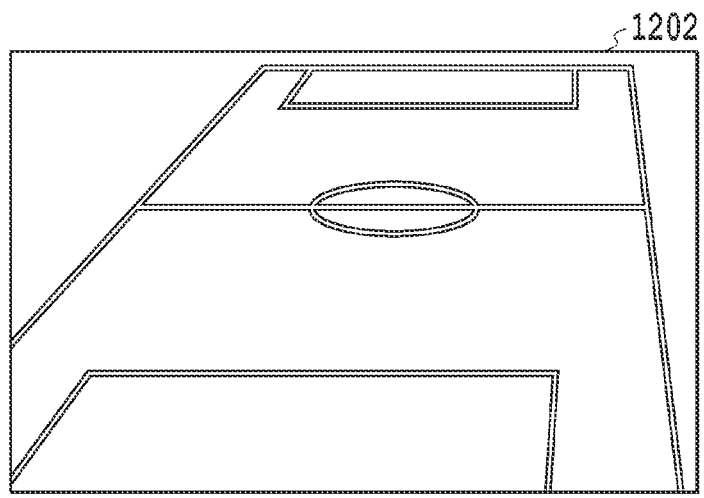
Figure 12C:
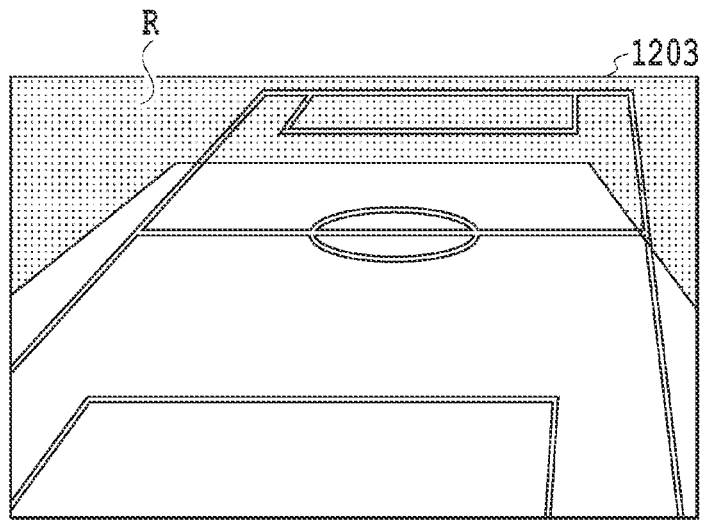

FIG. 12A to FIG. 12C are diagrams explaining the low-resolution area information. FIG. 12A shows an example of the background model with which the arrangement of the imaging apparatus is associated, FIG. 12B shows an example of the captured image of the imaging apparatus shown in FIG. 12A, and FIG. 12C shows an example of the image in which the low-resolution area information is associated with the captured image shown in FIG. 12B. As shown in FIG. 12A, based on the background model and the camera parameters of the imaging apparatus, the arrangement of an imaging apparatus C1 is associated with a background model 1201. The background model is data representing the three-dimensional space of the image capturing environment and in the present embodiment, the background model represents a simple sports stadium and as the data format, the background model is represented in the geometry definition file format that is also used in three-dimensional CG (Computer Graphics).

Then, from the camera parameters of the imaging apparatus C1 shown in FIG. 12A, in a captured image 1202 of the imaging apparatus C1, the resolution, which is the size per pixel, at the position close to the floor surface on the three-dimensional space is derived as shown in FIG. 12B. As the resolution derivation method, for example, it may also be possible to use a derivation method of taking the size on the three-dimensional space per pixel on the floor surface as resolution from the number of pixels of the captured image by deriving an area in which the floor surface at which the foreground of the background model is located overlaps the visual field of the imaging apparatus, that is, the pyramidal form, which is found from the camera parameters.

In the present embodiment, in a case where it is assumed that the threshold value of resolution is 2 cm, the low-resolution area information is derived as follows. That is, an area on the lower side in the captured image is relatively close from the imaging apparatus C1 and the size per pixel is 1 cm and this is smaller than the threshold value, and therefore, the area of interest is derived as an area that is not the low-resolution area. On the other hand, an area on the upper side in the captured image is relatively far from the imaging apparatus C1 and the size per pixel is 3 cm and this is larger than the threshold value, and therefore, the area of interest is derived as the low-resolution area. Consequently, from the results of the comparison with the threshold value for each area in the captured image, information for specifying the area whose size per pixel is larger than the threshold value is derived as low-resolution area information.

By comprehensively deriving the area indicating low resolution based on the threshold value in accordance with the resolution in the vicinity of the floor surface at which the foreground is located on the three-dimensional space, an image 1203 with which information for specifying a low-resolution area R whose resolution is larger than the threshold value is associated is derived as shown in FIG. 12C. The derived image (information) with which the low-resolution area is associated is sent to the conversion unit 1003.

At S1103, the conversion unit 1003 determines whether or not the foreground rectangular mask is included in the low-resolution area indicated in the low-resolution area information from the plurality of the foreground rectangular masks input from the input unit and the low-resolution area information input from the first derivation unit. In a case where determination results that the foreground rectangular mask is included in the low-resolution area are obtained (YES at S1103), the conversion unit 1003 moves the processing to SI 104. On the other hand, in a case where determination results that the foreground rectangular mask is not included in the low-resolution area are obtained (NO at S1103), the conversion unit 1003 sends an unconverted foreground rectangular mask to the generation unit 1004 and skips SI 104 and moves the processing to SI 105.

At S1104, the conversion unit 1003 performs the expansion processing for the foreground rectangular mask included in the low-resolution area of the captured image and generates a converted foreground rectangular mask. The converted foreground rectangular mask that is generated is sent to the generation unit 1004.

Figure 13A:
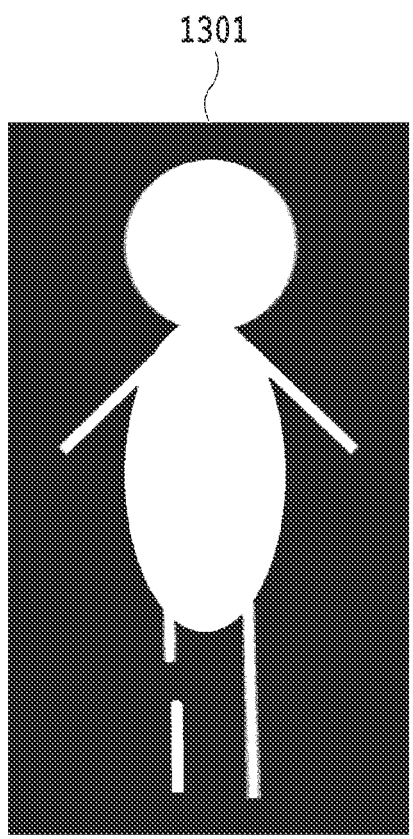
FIG. 13A and FIG. 13B are diagrams explaining expansion processing.
Figure 13B:
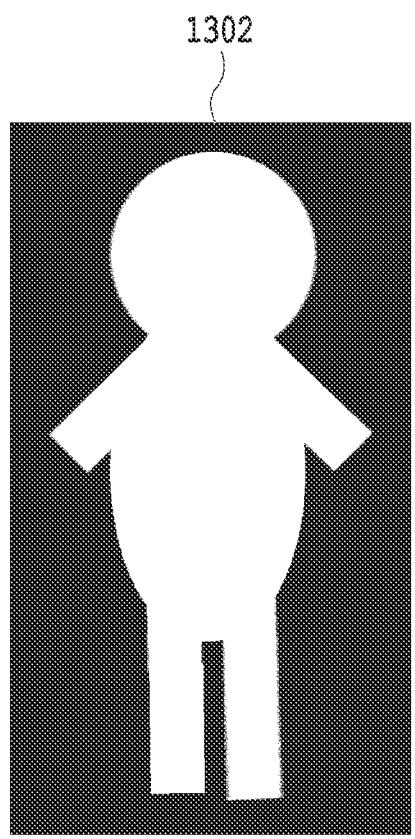

FIG. 13A and FIG. 13B are diagrams explaining the expansion processing and FIG. 13A shows an example of the received foreground rectangular mask and FIG. 13B shows a conversion example of the foreground rectangular mask (FIG. 13A). The conversion unit 1003 performs the expansion processing for the foreground rectangular mask in a case where the foreground rectangular mask is included within the low-resolution area even though there is an undetected portion (portion indicated in black) in part of the leg of the foreground as shown in FIG. 13A for example. Due to this, a converted foreground rectangular mask 1302 is generated, in which the undetected portion is complemented as a detected portion. The converted foreground rectangular mask is sent to the generation unit 1004.

Figure 14A:
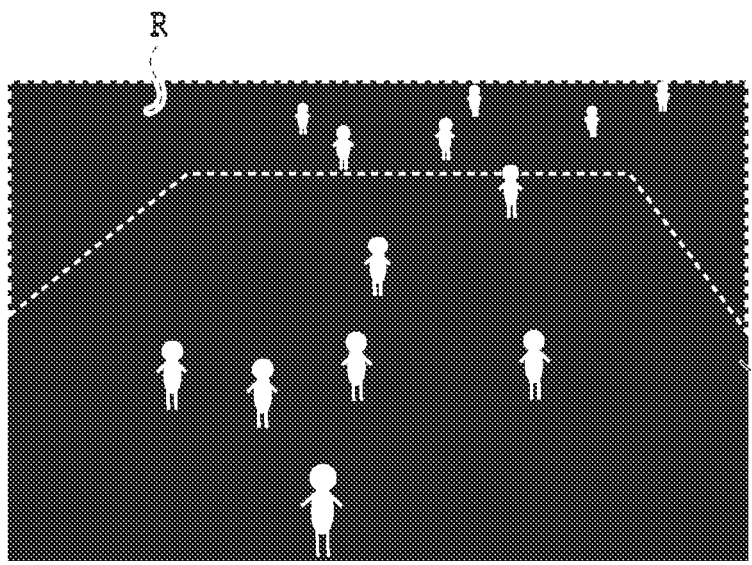
FIG. 14A to FIG. 14C are diagrams explaining expansion processing by a conversion unit.
Figure 14B:
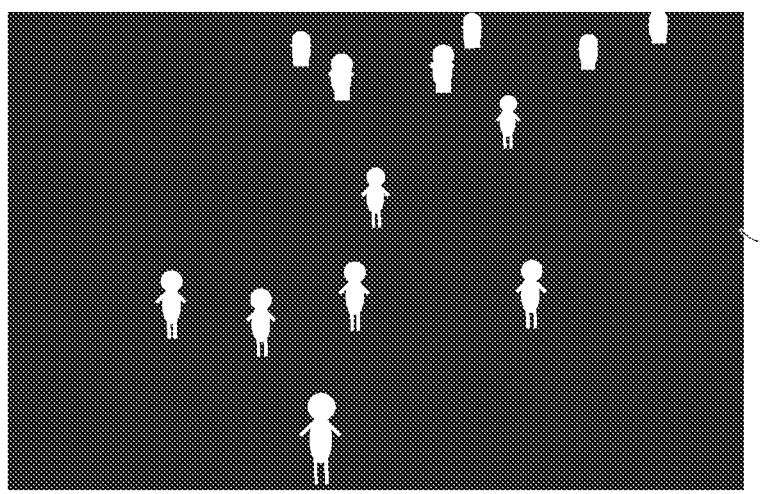
Figure 14C:
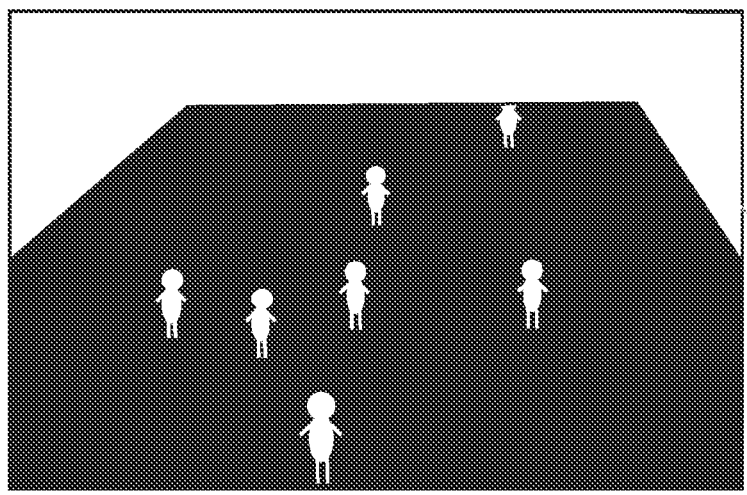

FIG. 14A to FIG. 14C are diagrams explaining the expansion processing by the conversion unit 1003. FIG. 14A shows an example of the foreground mask that corresponds to the captured image (FIG. 12A) of the imaging apparatus C1 and which is before the expansion processing is performed. FIG. 14B shows an example of the foreground mask image after the expansion processing is performed for the foreground rectangular mask included within the low-resolution area R (FIG. 12C) in the foreground mask image (FIG. 14A). Further, FIG. 14C shows an example of the foreground mask image after all the masks included within the low-resolution area R (FIG. 12C) in the foreground mask image (FIG. 14A) are replaced with white.

The conversion unit 1003 performs the expansion processing for the foreground rectangular mask included (existing) in the low-resolution area R in, for example, a foreground mask image 1401 and generates a converted foreground mask image 1402 in which a portion that should be detected as the foreground but is not detected yet is complemented.

Further, it may also be possible for the conversion unit 1003 to generate a converted foreground mask image 1403 in which it is made possible to complement the foreground by another foreground mask image by performing processing to replace the mask included in the low-resolution area R in, for example, the foreground mask image 1401 with white in place of the expansion processing. That is, it may also be possible for the conversion unit 1003 to generate a converted foreground mask image (mask image data) by replacing the portion corresponding to the low-resolution area with a foreground mask image (mask image) representing a two-dimensional silhouette of the object (foreground).

At S1105, the generation unit 1004 generates a foreground model by the visual hull method using the camera parameters and a foreground rectangular mask group including the unconverted foreground rectangular mask and the converted foreground rectangular mask. The generated foreground model is sent to the output unit 1005.

At S1106, the output unit 1005 outputs the model information including the foreground model that is input from the generation unit 1004 and the foreground rectangular texture that is input from the input unit 1001 to the rendering apparatus 14.

At S1107, whether or not the processing is completed for all the frames of the input data received at S1101 is determined. In a case where there is an unprocessed frame (YES at S1107), the processing returns to S1102, and the processing is continued by taking the next frame as a target. In a case where there is no unprocessed frame (NO at S1107), the flow shown in FIG. 11 is terminated.

The above is the flow of the processing performed by the generation apparatus 13 according to the present embodiment. In the flowchart in FIG. 11, the output unit 1005 outputs each frame, but it may also be possible for the output unit 1005 to output a plurality of frames at a time or output all the frames at a time at the point in time at which the processing for all the frames configuring the input data is completed.

As above, according to the present embodiment, it is possible to suppress the generation of a low-quality foreground model due to a foreground rectangular mask whose foreground extraction accuracy is low by performing the processing to expand the foreground rectangular mask included in the low-resolution area in the captured image or the processing to convert the foreground rectangular mask into white. That is, it is possible to suppress a reduction in the accuracy of the three-dimensional shape data of an object to be generated. Because of this, it is possible to generate a high-quality image that suppresses an omission of a foreground model.

Second Embodiment

Next, an aspect is explained as a second embodiment in which the influence by another foreground rectangular mask whose resolution is high on the generation of a foreground model is suppressed by expanding the foreground rectangular mask included in a low-reliability field in accordance with the degree of reliability indicating the degree of difficulty in extracting a foreground. The degree of difficulty in extracting a foreground can also be said as the degree of accuracy with which a foreground is extracted from a captured image. Explanation of the portions common to those of the first embodiment is omitted or simplified and in the following, different points are explained mainly. Here, as the area in which the accuracy of foreground extraction is reduced, mention is made of, for example, an area in which the luminance of a captured image is relatively low because of the shade or the like, an area whose color and luminance are similar to those of the background, an area in which the influence of noise being appended, such as rain blowing and rainfall, is large, and the like.

<Software Configuration>

Figure 15:
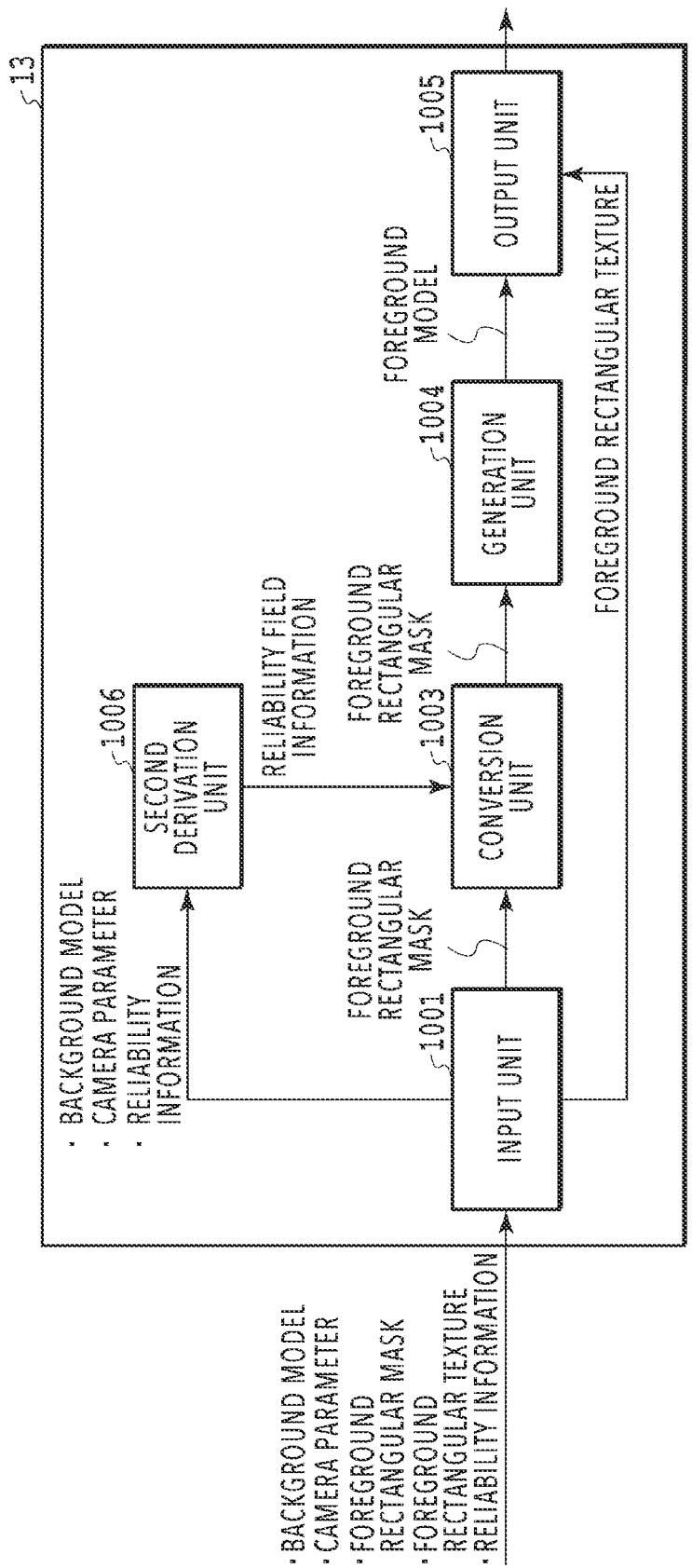
FIG. 15 is a diagram showing a function configuration example of the generation apparatus.

FIG. 15 is a function block diagram showing a software configuration example of the generation apparatus 13 of the present embodiment. The generation apparatus 13 has the input unit 1001, the conversion unit 1003, the generation unit 1004, and the output unit 1005. Then, the generation apparatus 13 has a second derivation unit 1006 in place of the first derivation unit 1002 of the first embodiment. Each of these function units is implemented by the CPU 111 within the above-described generation apparatus 13 loading a predetermined program stored in the ROM 113 or the storage apparatus 114 onto the RAM 112 and executing the program. In the following, the function of each unit is explained, but explanation of the same processing blocks (generation unit 1004 and output unit 1005) as those of the first embodiment is omitted.

The input unit 1001 receives inputs of various kinds of data from an external apparatus. Specifically, the input unit 1001 receives inputs of the data of the camera parameters of each of the imaging apparatuses 10a to 10r and the background model, and reliability information, to be described later in detail, from the control apparatus 12. The data of the camera parameters and the background model, and the reliability information, whose inputs, are received, are sent to the second derivation unit 1006. The reliability information is information that is derived based on at least one piece of information, for example, such as that the luminance is relatively low due to the shade or the like, that the color and luminance are similar to those of the background, and that the influence of noise being appended is relatively large due to rain blowing and rainfall, and which indicates the reliability that is set in accordance with the degree of the foreground extraction accuracy.

Further, the input unit 1001 receives inputs of the data of the foreground rectangular texture and the foreground rectangular mask, which are derived from the captured image of each imaging apparatus, from the foreground extraction apparatus group 11. The data of the foreground rectangular mask whose input is received is sent to the conversion unit 1003. The data of the foreground rectangular texture whose input is received is sent to the output unit 1005.

The second derivation unit 1006 derives information to which reliability is appended for each area within the captured image of each imaging apparatus as reliability field information based on the data of the background model and the camera parameters, and the reliability information, which are input from the input unit 1001, and the predetermined threshold value that is set in advance. The derived reliability field information is sent to the conversion unit 1003.

The conversion unit 1003 determines the expansion ratio in accordance with the degree of reliability based on the reliability field information and the foreground rectangular mask and generates a converted foreground rectangular mask by performing the expansion processing with the determined expansion ratio for the foreground rectangular mask for each area. Due to this, by expanding the mask portion of the mask image to increase the size of the silhouette of the foreground, the undetected foreground resulting from the low reliability is complemented and the possibility that part of the foreground is deleted erroneously becomes less strong, and a reduction in the accuracy of the data of the foreground model to be generated is suppressed. The generated foreground rectangular mask is sent to the output unit 1005.

<Processing Flow in Generation Apparatus>

Figure 16:
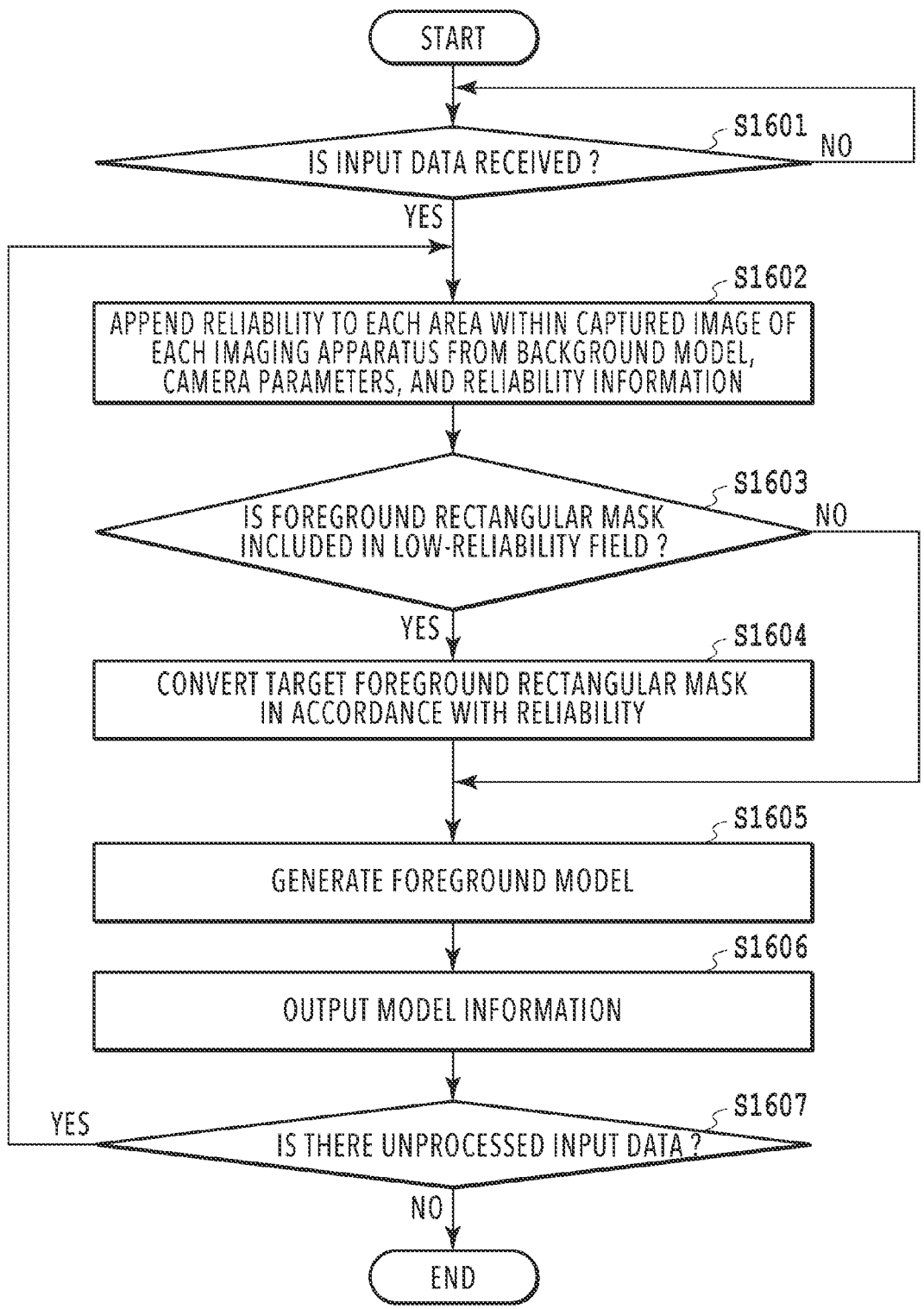
FIG. 16 is a flowchart showing a flow of processing performed by the generation apparatus.

FIG. 16 is a flowchart showing a flow of processing performed by the generation apparatus 13 according to the present embodiment. It is assumed that the camera parameters have already been received from the control apparatus 12 and stored in the RAM 112 or the like and the predetermined threshold value by which reliability 0, 1, 2, or 3 is determined has already been set based on the user input before the execution of the flowchart in FIG. 16 is started. In the following, along the flowchart in FIG. 16, the flow of the processing performed by the generation apparatus 13 is explained.

At S1601, the input unit 1001 monitors the reception of input data (data of foreground rectangular mask of each imaging apparatus) necessary for the generation of a foreground model. In a case where the reception of input data is detected (YES at S1601), the input unit 1001 moves the processing to S1602. The various kinds of data that are input to the input unit 1001 are sent to each function unit. In the present embodiment, it is premised that the data of a plurality of captured images is a moving image, and therefore, the processing at S1602 and the subsequent steps is performed for each frame.

At S1602, the second derivation unit 1006 derives reliability field information to which the degree of reliability is appended for each area within the captured image of each imaging apparatus based on the camera parameter, the background model, and the reliability information, which are input from the input unit 1001, and the threshold value that is set in advance. The reliability field area information is information for specifying reliability for each area within the captured image of each imaging apparatus.

Figure 17A:
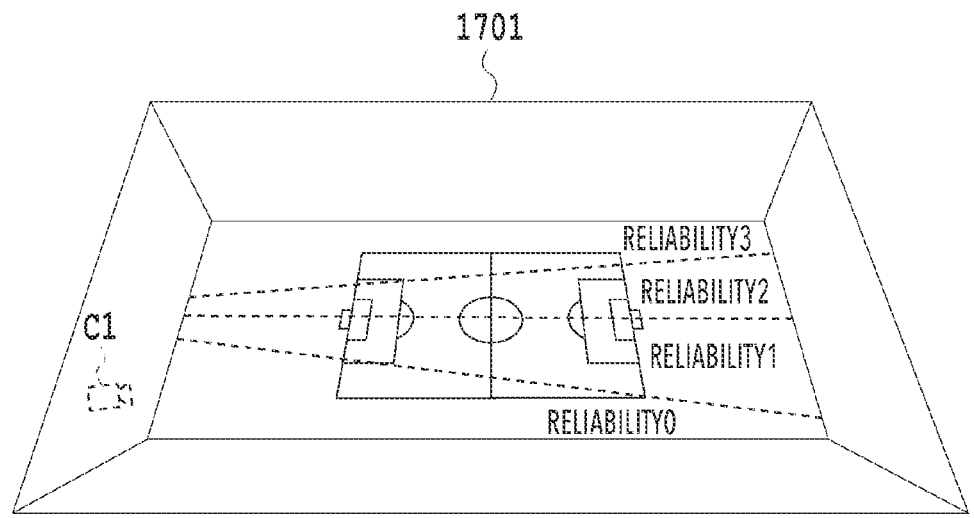
FIG. 17A and FIG. 17B are diagrams explaining reliability field information.
Figure 17B:
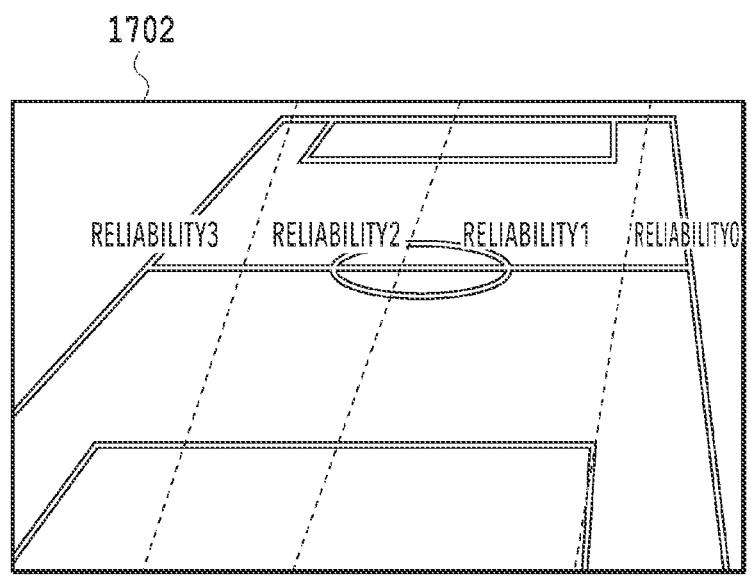

FIG. 17A and FIG. 17B are diagrams explaining the reliability field information. FIG. 17A shows an example of the background model in which the arrangement of the imaging apparatus and the reliability information are associated with each other and FIG. 17B shows an example of the image in which the reliability field information is associated with the captured image of the imaging apparatus shown in FIG. 17A.

Based on the background model, the camera parameters of the imaging apparatus, and the reliability information, as shown in FIG. 17A, the arrangement of the imaging apparatus C1 and the degree of reliability for each area are associated with each other in a background model 1701. The reliability information is information that is set by a user operation and is information in which the reliability is caused to correspond to the extraction accuracy of the foreground on the three-dimension space. The reliability information is information that is set based on information on at least one area of, for example, the area in which the luminance is relatively low in the captured image due to the shade or the like, the area in which the color and luminance are similar to those of the background, and the area in which the influence of noise being appended is relatively large due to rain blowing, rainfall or the like, and which indicates the reliability corresponding to the degree of the foreground extraction accuracy. The reliability information may be, for example, information including reliability 0, reliability 1, reliability 2, and reliability 3. Reliability 0 indicates that the foreground extraction accuracy is the lowest of reliability 0 to reliability 3. Reliability 3 indicates that the foreground extraction accuracy is the highest of reliability 0 to reliability 3. Reliability 1 indicates that the foreground extraction accuracy is higher than that indicated by reliability 0 but the foreground extraction accuracy is lower than that indicated by reliability 2 of reliability 0 to reliability 3. Reliability 2 indicates that the foreground extraction accuracy is higher than that indicated by reliability 1 but the foreground extraction accuracy is lower than that indicated by reliability 3. That is, the reliability indicates that reliability 3 indicates the highest foreground extraction accuracy and the foreground extraction accuracy becomes lower in order of reliability 2, reliability 1, and reliability 0. The reliability information is not limited to the four of reliability 0, reliability 1, reliability 2, and reliability 3. The reliability information is only required to include at least information for specifying that the foreground extraction accuracy is low and the number of reliabilities may be four or more or less.

Then, from the camera parameters of the imaging apparatus C1 shown in FIG. 17 and the reliability information, as shown in FIG. 17B, in a captured image 1702 of the imaging apparatus C1, based on the reliability field in the vicinity of the floor surface shown in FIG. 17A, reliability field information in which the area is divided for each reliability is derived and obtained. The reliability information is input as information that defines the area on the three-dimensional space like the background model and for example, input as an object defined by a specific name. The second derivation unit 1006 derives information on the area whose reliability is lower than a threshold value as low-reliability field information based on the reliability field information and the threshold value. The low-reliability field information may include information on the areas of reliability 0, reliability 1, and reliability 2. The derived low-reliability field information is sent to the conversion unit 1003.

At S1603, the conversion unit 1003 determines whether or not the foreground rectangular mask is included in the low-reliability field indicated in the low-reliability field information based on the plurality of the foreground rectangular masks input from the input unit and the low-reliability field information input from the second derivation unit. In a case where determination results that the foreground rectangular mask is included in the low-reliability field are obtained (YES at S1603), the conversion unit 1003 moves the processing to S1604. On the other hand, in a case where determination results that the foreground rectangular mask is not included in the low-reliability field are obtained (NO at S1603), the conversion unit 1003 sends an unconverted foreground rectangular mask to the generation unit 1004 and skips S1604 and moves the processing to S1605.

At S1604, the conversion unit 1003 performs the expansion processing with an expansion ratio in accordance with the degree of reliability for the foreground rectangular mask included in the low-reliability field in the captured image and generates a converted foreground rectangular mask. The converted foreground rectangular mask that is generated is sent to the generation unit 1004.

Figure 18A:
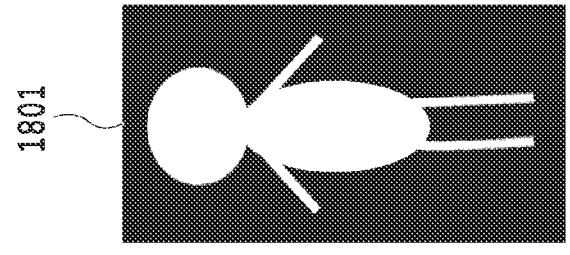
FIG. 18A to FIG. 18D are diagrams explaining expansion processing.
Figure 18B:
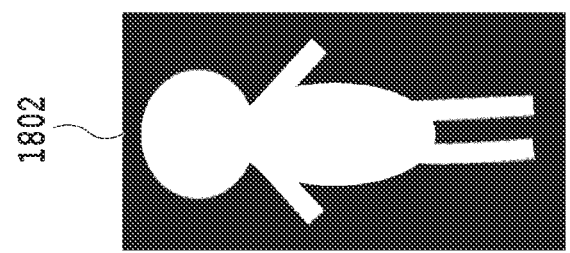
Figure 18C:
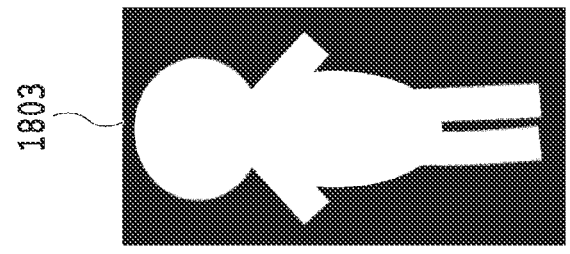
Figure 18D:
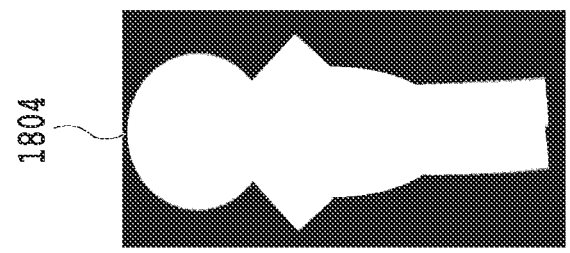

FIG. 18A to FIG. 18D are diagrams explaining the expansion processing and FIG. 18A shows an example of the received foreground rectangular mask and FIG. 18B to FIG. 18D show conversion examples of the foreground rectangular mask (FIG. 18A) in accordance with reliability 2, reliability 1, and reliability 0. Reliability 3 indicates that the reliability is the highest and it is assumed that the expansion processing is not performed for the foreground rectangular mask included in the area of reliability 3. The figure of reliability is smaller than 3 like reliability 2, reliability 1, and reliability 0, and the smaller the figure of reliability, the more the amount by which the foreground rectangular mask is increased, and thereby, the possibility that the undetected foreground is complemented is made stronger.

The conversion unit 1003 performs the expansion processing with an expansion ratio (expansion amount) in accordance with the degree of reliability for, for example, a foreground rectangular mask 1801 included in the area of reliability 2 in the captured image. The conversion unit 1003 generates a converted foreground mask image 1802 whose undetected portion that should be detected as the foreground is complemented by the expansion processing. The conversion unit 1003 performs the expansion processing with an expansion ratio (expansion amount) in accordance with the degree of reliability for, for example, the foreground rectangular mask 1801 included in the area of reliability 1 in the captured image. The conversion unit 1003 generates a converted foreground mask image 1803 whose undetected portion that should be detected as the foreground is complemented by the expansion processing. The conversion unit 1003 performs the expansion processing with an expansion ratio (expansion amount) in accordance with the degree of reliability for, for example, the foreground rectangular mask 1801 included in the area of reliability 0 in the captured image. The conversion unit 1003 generates a converted foreground mask image 1804 whose undetected portion that should be detected as the foreground is complemented by the expansion processing. That is, the conversion unit 1003 generates the data of a converted foreground rectangular mask by performing the expansion processing for the foreground rectangular mask with an expansion ratio determined in accordance with the reliability of the area in which the foreground rectangular mask is included. The converted foreground rectangular mask image is sent to the generation unit 1004.

Figure 19A:
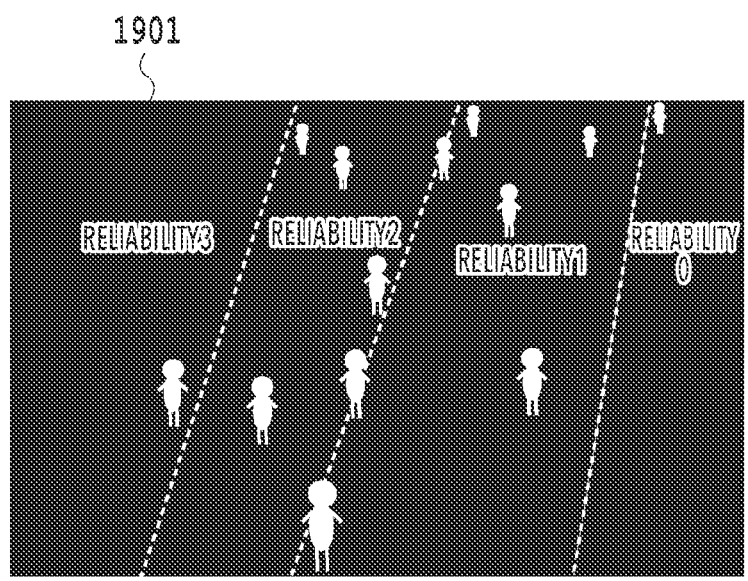
FIG. 19A and FIG. 19B are diagrams explaining expansion processing by the conversion unit.
Figure 19B:
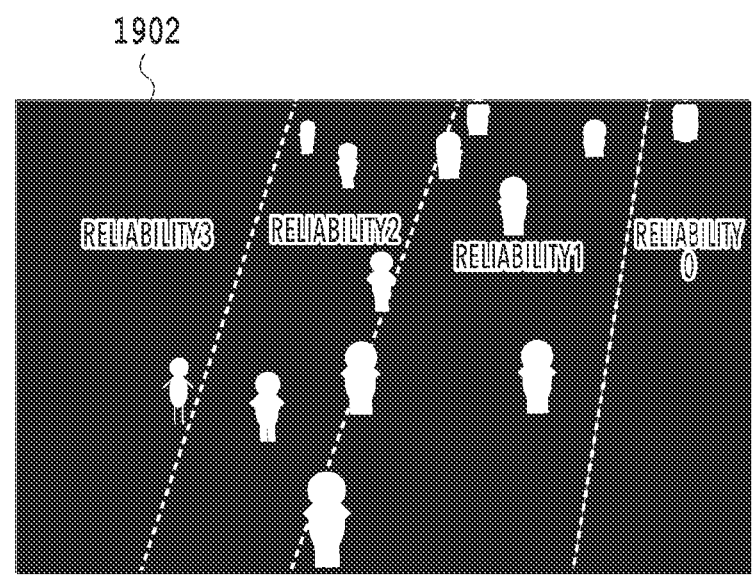

FIG. 19A and FIG. 19B are diagrams explaining the expansion processing by the conversion unit 1003. FIG. 19A shows an example of the foreground mask image before the expansion processing is performed for the captured image (FIG. 17A) of the imaging apparatus C1. FIG. 19B shows an example of the foreground mask image after the expansion processing is performed for the foreground rectangular mask included in each area with an expansion ratio determined in accordance with the degree of reliability for each area (FIG. 17B) in the foreground mask image (FIG. 19A).

The conversion unit 1003 generates a converted foreground mask image 1902 in which the portion that should be detected as the foreground but whose reliability is low is complemented by performing the expansion processing with an expansion ratio determined in accordance with the degree of reliability of each area (FIG. 17B) in, for example, a foreground mask image 1901.

Further, it may also be possible for the conversion unit 1003 to generate a converted foreground mask image in which it is made possible to complement the foreground by another foreground mask image by performing, for example, processing to replace a mask existing in the low-reliability field (for example, area of reliability 0) in the foreground mask image 1901 with white in place of the expansion processing.

At S1605, the generation unit 1004 generates a foreground model by the visual hull method using the camera parameters and the foreground rectangular mask group including the unconverted foreground rectangular mask and the converted foreground rectangular mask. The generated foreground model is sent to the output unit 1005.

At S1606, the output unit 1005 outputs the model information including the foreground model that is input from the generation unit 1004 and the foreground rectangular texture that is input from the input unit 1001 to the rendering apparatus 14.

At S1607, whether or not the processing is completed for all the frames of the input data received at S1601 is determined. In a case where there is an unprocessed frame (YES at S1607), the processing returns to S1602 and the processing is continued by taking the next frame as a target. In a case where there is no unprocessed frame (NO at S1607), the flow shown in FIG. 16 is terminated.

The above is the flow of the processing performed by the generation apparatus 13 according to the present embodiment. In the flowchart in FIG. 16, the output unit 1005 outputs each frame, but it may also be possible for the output unit 1005 to output a plurality of frames at a time or output all the frames at a time at the point in time at which the processing for all the frames configuring the input data is completed.

As above, according to the present embodiment, it is possible to suppress the generation of a low-quality foreground model due to a foreground rectangular mask whose foreground extraction accuracy is low by expanding a foreground rectangular mask included in a low-reliability field in a captured image with an expansion ratio determined in accordance with the degree of reliability, or converting the foreground rectangular mask into white. That is, it is possible to suppress a reduction in the accuracy of three-dimensional shape data of an object to be generated. Because of this, it is possible to generate a high-quality image in which an omission of a foreground model is suppressed.

Other Embodiments

In the above-described embodiment, the case is illustrated where a soccer game is captured, but the image-capturing target is not necessarily limited to this. For example, it is possible to apply the present embodiment also to image capturing of other sports games, for example, such as rugby, tennis, ice skating, and basketball, and live concerts, and the like.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present embodiment, it is made possible to suppress a reduction in the accuracy of three-dimensional shape data of an object to be generated.

This application claims the benefit of Japanese Patent Application No. 2020-117759, filed Jul. 8, 2020, which is hereby incorporated by reference wherein in its entirety.

What is claimed is:

1. An image processing apparatus comprising:
one or more memories storing instructions; and
one or more processors executing the instructions to;
obtain an image representing an object, which is extracted from a captured image;
obtain information for specifying an area whose extraction accuracy of the object is lower than a threshold value in the captured image;
perform image processing on the specified area of the obtained image for expanding a foreground area, which is not extracted from the obtained image;
derive information for specifying a low-resolution area whose resolution is higher than a predetermined threshold value in the captured image as the information for specifying the area whose extraction accuracy of the object is lower than the threshold value based on parameters and three-dimensional shape data of a background representing a three-dimensional space of an image capturing environment; and
generate three-dimensional shape data of the object based on the processed specific area in the obtained image representing the object.

2. The image processing apparatus according to claim 1, wherein
the one or more processors execute the instructions to:
perform expansion processing for the object included in the low-resolution area as the image processing.

3. The image processing apparatus according to claim 1, wherein
the one or more processors execute the instructions to:
replace a portion corresponding to the low-resolution area with an image presenting an object as the image processing.

4. The image processing apparatus according to claim 1, wherein
the one or more processors further execute the instructions to:
derive information for specifying a low-reliability field whose reliability is lower than a predetermined threshold value in the captured image as the information for specifying the area whose extraction accuracy of an object is lower than the threshold value based on parameters, the three-dimensional shape data of the background representing the three-dimensional space of the image capturing environment, and reliability information that is set in accordance with an accuracy with which the object is extracted from the captured image.

5. The image processing apparatus according to claim 4, wherein
the one or more processors execute the instructions to:
perform expansion processing for the object included in the low-reliability field as the image processing.

6. The image processing apparatus according to claim 4, wherein
the one or more processors execute the instructions to:
perform expansion processing, as the image processing, for the object included in the low-reliability field with an expansion ratio determined in accordance with a degree of reliability of the low-reliability field in which the object is included.

7. The image processing apparatus according to claim 4, wherein
the one or more processors execute the instructions to:
replace a portion corresponding to the low-reliability field with an image representing an object as the image processing.

8. The image processing apparatus according to claim 4, wherein
the reliability information is information that is derived based on at least one piece of information, such as that luminance is relatively low, that a color or luminance is similar to that of the background, and that an influence of noise being appended is relatively large, and which indicates reliability that is set in accordance with a degree of extraction accuracy of the object.

9. An image processing method comprising:
obtaining an image representing an object, which is extracted from a captured image;
obtaining information for specifying an area whose extraction accuracy of the object is lower than a threshold value in the captured image;
performing image processing on the specified area of the obtained image for expanding a foreground area, which is not extracted from the obtained image;
deriving information for specifying a low-resolution area whose resolution is higher than a predetermined threshold value in the captured image as the information for specifying the area whose extraction accuracy of the object is lower than the threshold value based on parameters and three-dimensional shape data of a background representing a three-dimensional space of an image capturing environment; and
generating three-dimensional shape data of the object based on the obtained image representing the object for which the image processing has been performed.

10. A non-transitory computer readable storage medium storing a program for causing a computer to execute an image processing method, the image processing method comprising:
obtaining an image representing an object, which is extracted from a captured image;
obtaining information for specifying an area whose extraction accuracy of the object is lower than a threshold value in the captured image;
performing image processing on the specified area of the obtained image for expanding a foreground area, which is not extracted from the obtained image;
deriving information for specifying a low-resolution area whose resolution is higher than a predetermined threshold value in the captured image as the information for specifying the area whose extraction accuracy of the object is lower than the threshold value based on parameters and three-dimensional shape data of a background representing a three-dimensional space of an image capturing environment; and
generating three-dimensional shape data of the object based on the obtained image representing the object for which the image processing has been performed.

\* \* \* \* \*